(12) United States Patent
Kim et al.

(10) Patent No.: US 9,470,926 B2
(45) Date of Patent: Oct. 18, 2016

(54) LIQUID CRYSTAL LENS MODULE

(71) Applicant: SAMSUNG DISPLAY CO., LTD., Yongin, Gyeonggi-Do (KR)

(72) Inventors: Kang-Min Kim, Hwaseong-Si (KR); Jeong Min Sung, Suwon-Si (KR); Sung-Woo Lee, Anyang-Si (KR); Hyung Woo Yim, Goyang-Si (KR); Seung Jun Jeong, Hwaseong-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 163 days.

(21) Appl. No.: 14/261,287

(22) Filed: Apr. 24, 2014

(65) Prior Publication Data
US 2015/0160508 A1    Jun. 11, 2015

(30) Foreign Application Priority Data

Dec. 6, 2013  (KR) .......................... 10-2013-0151800

(51) Int. Cl.
| | | |
|---|---|---|
| G02F 1/13 | (2006.01) | |
| G02F 1/1335 | (2006.01) | |
| G02F 1/1333 | (2006.01) | |
| G02F 1/29 | (2006.01) | |
| G02B 27/22 | (2006.01) | |
| H04N 13/04 | (2006.01) | |

(Continued)

(52) U.S. Cl.
CPC ..... *G02F 1/133526* (2013.01); *G02B 27/2214* (2013.01); *G02F 1/29* (2013.01); *H04N 13/0404* (2013.01); *G02F 1/13452* (2013.01); *G02F 1/134309* (2013.01); *G02F 2001/294* (2013.01)

(58) Field of Classification Search
CPC ............... G02F 1/133526; G02F 1/29; G02F 2001/294; G02F 2203/28; G02F 1/134309; G02F 1/1339; G02F 2001/13415; G02F 1/1345; G02F 1/133377; G02F 1/133512; G02F 1/133345; G02B 27/2214; G02B 27/26; H04N 13/0404
USPC ............................................ 349/200, 84, 15
See application file for complete search history.

(56) References Cited

U.S. PATENT DOCUMENTS

| | | | |
|---|---|---|---|
| 6,064,424 A | 5/2000 | Van Berkel et al. | |
| 8,279,362 B2 | 10/2012 | Yun et al. | |
| 2001/0048502 A1 | 12/2001 | Moon et al. | |

(Continued)

FOREIGN PATENT DOCUMENTS

| | | |
|---|---|---|
| JP | 09-127547 | 5/1997 |
| JP | 2009-075262 | 4/2009 |

(Continued)

OTHER PUBLICATIONS

European Search Report Dated Mar. 24, 2015.

*Primary Examiner* — Mike Qi
(74) *Attorney, Agent, or Firm* — F. Chau & Associates, LLC

(57) ABSTRACT

A liquid crystal lens module includes: a first substrate that includes a plurality of lens electrodes and a plurality of bus lines; a second substrate facing the first substrate; and a liquid crystal layer provided between the first substrate and the second substrate. The plurality of bus lines include at least two bus lines having different widths, and the plurality of lens electrodes include first electrodes and second electrodes that are electrically insulated from each other A widest bus line of the at least two bus lines is connected to a widest lens electrode of the plurality of lens electrodes.

31 Claims, 22 Drawing Sheets

(51) Int. Cl.
  *G02F 1/1343* (2006.01)
  *G02F 1/1345* (2006.01)

(56) References Cited

U.S. PATENT DOCUMENTS

| | | | |
|---|---|---|---|
| 2006/0290838 A1* | 12/2006 | Ro | G02F 1/13394 349/60 |
| 2008/0297674 A1* | 12/2008 | Sakamoto | G02F 1/133555 349/37 |
| 2011/0249206 A1* | 10/2011 | Liu | G02F 1/134309 349/33 |
| 2012/0162550 A1 | 6/2012 | Jeong et al. | |
| 2012/0249506 A1 | 10/2012 | Jeong et al. | |
| 2012/0300042 A1* | 11/2012 | Yun | H04N 13/0404 348/51 |
| 2013/0100366 A1 | 4/2013 | Yun et al. | |
| 2013/0107147 A1 | 5/2013 | Whangbo et al. | |
| 2013/0107174 A1 | 5/2013 | Yun et al. | |
| 2013/0120366 A1 | 5/2013 | Lee et al. | |
| 2013/0169913 A1 | 7/2013 | Choi et al. | |
| 2015/0346560 A1* | 12/2015 | Song | G02B 27/2228 349/15 |

FOREIGN PATENT DOCUMENTS

| | | |
|---|---|---|
| KR | 10-2010-0048819 | 5/2010 |
| KR | 10-2010-0075302 | 7/2010 |
| KR | 1020100075301 | 7/2010 |
| KR | 10-2011-0104701 | 9/2011 |
| KR | 1020150032387 | 3/2013 |
| KR | 10-2013-0055997 | 5/2013 |
| KR | 10-2013-0060637 | 6/2013 |
| KR | 10-2013-0097528 | 9/2013 |
| WO | WO 2006/117707 | 11/2006 |

* cited by examiner

LIQUID CRYSTAL LENS MODULE

CROSS-REFERENCE TO RELATED APPLICATION

This application claims priority from Korean Patent Application No. 10-2013-0151800 filed in the Korean Intellectual Property Office on Dec. 6, 2013, and all the benefits accruing therefrom, the contents of which are herein incorporated by reference in their entirety.

BACKGROUND (a) Technical Field

The present disclosure relates to a liquid crystal lens module.

(b) Discussion of the Related Art

With the development of display device technology, a display device that can display a 3-dimensional (3D) image has drawn attention, and various methods of displaying a 3D image have been studied.

A common method of implementing a stereoscopic image display uses binocular disparity. Binocular disparity methods involve displaying an image for a left eye and an image for a right eye in the same display device and transmitting the two images to the left eye and the right eye, respectively. That is, each image is viewed at a different angle by each eye and thus an observer may perceive a 3D effect.

Binocular disparity methods include using a barrier, using a lenticular lens which is a kind of cylindrical lens, etc.

In a 3D image display device that uses a barrier, a slit is formed in the barrier which divides the image from the display device into a left eye image and a right eye image, and the divided image is transmitted to the left eye and the right eye of the observer, respectively.

A 3D image display device that uses a lenticular lens divides the image from the 3D image display device into the left eye image and the right eye image by using the lens to change a light path.

Recently, a liquid crystal lens method has been developed that can realize a lens shape by controlling alignment of liquid crystals using an electric field. A liquid crystal lens method uses a lens panel that includes an upper panel, a lower panel, and a liquid crystal layer provided between the upper panel and the lower panel. The lens panel includes electrodes that form an electric field with voltages applied thereto and refract light in the liquid crystal so that the lens panel can function as a lens.

As the size of a display device increases, a lens panel that displays a stereoscopic image needs to increase in size, and accordingly response time delay and coupling between electrodes may occur.

SUMMARY

Embodiments of the present disclosure can provide a liquid crystal lens module having a new bus line design structure for a large-sized display panel.

A liquid crystal lens module according to an exemplary embodiment of the present disclosure includes: a first substrate that includes a plurality of lens electrodes and a plurality of bus lines; a second substrate facing the first substrate; and a liquid crystal layer provided between the first substrate and the second substrate. The plurality of bus lines include at least two bus lines having different widths, the plurality of lens electrodes include at least two lens electrodes having different widths, and a widest bus line of the at least two bus lines is connected to a widest lens electrode of the at least two lens electrodes.

The plurality of lens electrodes may include the first electrodes and the second electrodes which are electrically insulated from each other.

The at least two bus lines may include an X bus line having a larger width and a Y bus line having a smaller width, and the X bus line is disposed closest to the lens area.

The at least two bus lines may include an X bus line having a larger width and a Y bus line having a smaller width, and the X bus line may be disposed closest to the lens area.

The plurality of bus lines may include upper bus line portions, lower bus line portions, left bus line portions, and right bus line portions, and the upper bus line portions and the lower bus line portions may be disposed on long sides of the peripheral area while the left bus line portions and the right bus line portions may be disposed on short sides of the peripheral area.

The liquid crystal lens module may further include a lens driver disposed in the peripheral area, and the lens driver may be disposed adjacent to the upper bus line portion and may comprise a plurality of driving channels.

The plurality of bus lines may continuously surround the lens area.

The width of the upper bus line portion may be smaller than the width of the lower bus line portion, the width of the left bus line portion, and the width of the right bus line portion.

The plurality of lens electrodes may include a middle electrode that is a widest electrode of the plurality of lens electrodes, and the middle electrode may be connected with the X bus line.

At least one bus line of the plurality of bus lines may be connected to at least two driving channels of the plurality of driving channels.

The number of driving channels connected to the X bus line may be greater than the number of driving channels connected to the Y bus line.

The plurality of driving channels may have the same output.

Each of the plurality of driving channels may be connected to each of the plurality of bus lines.

At least two driving channels of the plurality of driving channels may have different outputs.

An output of the driving channel connected to the X bus line may be greater than an output of the driving channel connected to the Y bus line.

The liquid crystal lens module may further include a plurality of lens drivers disposed in the peripheral area, each of the plurality of lens drivers including a plurality of driving channels, and a periodic structure that connects the plurality of driving channels to the plurality of bus lines in one driving channel portion.

The upper bus line portion, the left bus line portion, the lower bus line portion, and the right bus line portion may be connected with each other such that one line is formed.

One end of each of the plurality of lens electrodes is connected with the upper bus line portions, and the other end of each of the plurality of lens electrodes is connected with the lower bus line portions.

The liquid crystal lens module may further include a lens driver disposed adjacent to the upper bus line portion, wherein the lens driver may include a plurality of driving channels, and the plurality of driving channels may be directly connected to the upper bus line portion.

All neighboring bus lines of the plurality of bus lines may have the same gap.

The liquid crystal lens module may further include a common electrode line disposed on the first substrate and located at an outer side of the plurality of bus lines and a common electrode disposed on the second substrate, and the common electrode may include a first common electrode line and a second common electrode line.

The first common electrode line may have a shorting portion adjacent to at least one of the left bus line portion and the right bus line portion, and the first common electrode line and the second common electrode line may be electrically connected with the common electrode through the shorting portion.

The liquid crystal lens module may further include a sealant disposed at an outer side of the plurality of bus lines that bonds the first substrate and the second substrate to each other, and the first common electrode line may be provided between the sealant and the plurality of bus lines.

The second common electrode line may overlap the sealant, the sealant may be made of a conductive material, and the second common electrode line may be electrically connected with the common electrode.

The first common electrode line and the second common electrode line may be applied with different voltages.

The plurality of lens drivers may generate inverse driving signals.

The inverse driving signal may have a step-shaped voltage level before inversion driving.

The plurality of bus lines may include a plurality of Y bus lines having a width that is less than that of the X bus line, and the widths of the plurality of Y bus lines may gradually increase from a narrowest Y bus line along a direction toward the X bus line.

The first electrode and the second electrode may form a unit lens, the unit lens may be divided into a plurality of refractive areas, and the width of the first electrode and the width of second electrode may be gradually increased toward a refractive area at the center of the unit lens from a refractive area at the edge of the unit lens.

The liquid crystal lens module may satisfy Lx:Bx=Ly:By, whereBy is the width of the X bus line, Bx is the width of the Y bus line, Ly is the width of a lens electrode connected with the X bus line, and Lx is the width of a lens electrode connected with the Y bus line The liquid crystal lens module may satisfy $0.5*(Ly*Bx)/Lx < By \leq (Ly*Bx)/Lx$ A liquid crystal lens module according to an exemplary embodiment of the present disclosure includes: a first substrate that includes a plurality of lens electrodes and a plurality of bus lines; a second substrate facing the first substrate; and a liquid crystal layer provided between the first substrate and the second substrate. The plurality of bus lines include at least two bus lines having different widths, the plurality of lens electrodes include at least two lens electrodes having different widths, and a widest bus line of the at least two bus lines is connected to a lens electrode having a central position of the plurality of lens electrodes.

According to the exemplary embodiment of the present disclosure, a bus line has a single routing structure to support dual driving, which may reduce RC delay. In addition, a step-shaped voltage level signal is applied before inverse driving to reduce a peak current generated during inversion driving of the liquid crystal lens module.

DETAILED DESCRIPTION OF EXEMPLARY EMBODIMENTS

Figure 1:
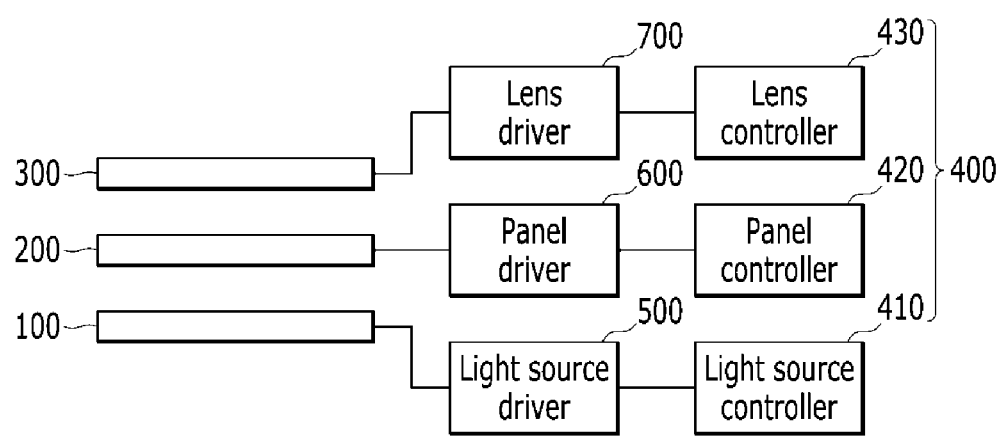
FIG. 1 is a block diagram of a display device according to an exemplary embodiment of the present disclosure.

Hereinafter, exemplary embodiments of the present disclosure will be described in detail with reference to the accompanying drawings. As those skilled in the art would realize, the described embodiments may be modified in various different ways, all without departing from the spirit or scope of the present disclosure.

In the drawings, the thickness of layers, films, panels, regions, etc., are exaggerated for clarity. It will be understood that when a layer is referred to as being "on" another layer or substrate, it can be directly on the other layer or substrate or intervening elements may also be present. Like reference numerals may designate like elements throughout the specification.

FIG. 1 is a block diagram of a display device according to an exemplary embodiment of the present disclosure. A display device according to a present exemplary embodiment includes a light source module, a display panel module, and a liquid crystal lens module.

Referring to FIG. 1, a light source module includes a light source unit 100, a light source controller 410, and a light source driver 500. A display panel module includes a display panel 200, a panel controller 420, and a panel driver 600. A liquid crystal lens module includes a lens panel 300, a lens controller 430, and a lens driver 700.

The light source unit 100 supplies light to the display panel 200. The light source unit 100 includes a light source generating light.

The display panel 200 is disposed on the light source unit 100. The display panel 200 may have two panel substrates facing each other and a liquid crystal layer disposed between the two panel substrates. The display panel 200 may be a liquid crystal display, but may also be any of various other types of display devices to which a liquid crystal lens module can be applied. For example, the display panel 200 may be a plasma display device, an electrophoretic display, or a nano-liquid crystal display formed by filling a plurality of cavities with a liquid crystal. If the display panel 200 is an organic light emitting device, the light source module may be omitted.

The display panel 200 includes a plurality of gate wires, a plurality of data wires, and a plurality of pixel electrodes respectively connected to the gate wires and the data wires. Each pixel includes a switching element and a liquid crystal capacitor electrically connected to the switching element. The gate wires, the data wires, and pixel electrodes may be disposed in a lower panel and a common electrode may be disposed in an upper display panel, but such a structure may be changed.

The display panel 200 can display a 2D image in a 2D mode and a 3D image in a 3D mode.

The lens panel 300 is disposed on the display panel 200. The lens panel 300 may include a lower panel and an upper panel that face each other, and a liquid crystal layer disposed between the lower panel and the upper panel. The lens panel 300 includes a plurality of unit lenses that may be provided in the lower panel and a common electrode that may be provided in the upper panel. A driving voltage applied to the lens electrodes and the common electrode may adjust an alignment of liquid crystal molecules of the liquid crystal layer, which changes the refractive index of the lens panel 300, which will be described in detail below with reference to FIG. 3.

The lens panel 300 may be driven in 2D or 3D mode. For example, in 2D mode, the lens panel 300 may be turned off to directly transmit an unrefracted image received from the display panel 200. Thus, the same image reaches the left and right eyes such that an observer views a 2D image.

In 3D mode, the lens panel 300 is turned on and thus operates as a lens to refract the image provided from the display panel 200. Thus, the lens panel 300 divides the image received from the display panel 300 into different viewing fields that correspond to the left eye and the right eye such that the observer views a 3D image.

A controller 400 receives input image data, input lens data, and an input control signal from an external source.

The input image data may include 2D image data and 3D image data. The input image data may include red image data, green image data, and blue image data. The input lens data may be voltage data provided to the lens electrodes of the liquid crystal layer to change a refractive index of the lens. The input control signal may include a master clock signal, a vertical synchronization signal, and an inversion signal.

The controller 400 may determine a driving mode that may be either the 2D mode or the 3D mode based on the input image data. However, the controller 400 may receive the driving mode determination from an external source.

The controller 400 includes the light source controller 410, the panel controller 420, and the lens controller 430. The light source controller 410, the panel controller 420, and the lens controller 430 may be logically divided but they may not be physically divided.

The light source controller 410 generates a light source control signal and outputs the light source control signal to the light source driver 500. The light source controller 410 may generate different light source control signals depending on the driving mode.

The panel controller 420 generates a panel control signal and a panel data signal based on the driving mode, the input control signal, and the input image data, and outputs the panel control signal and the panel data signal to the panel driver 600.

The lens controller 430 generates a lens control signal and a lens data signal based on the driving mode, the input control signal, and the input lens data, and outputs the generated signals to the lens driver 700.

The lens driver 700 receives the lens data signal and the lens control signal from the lens controller 430.

The lens driver 700 converts the lens data signal into analog lens voltages in response to the lens control signal. The lens driver 700 outputs the lens voltages to the lens electrodes of the lens panel 300.

Figure 2:
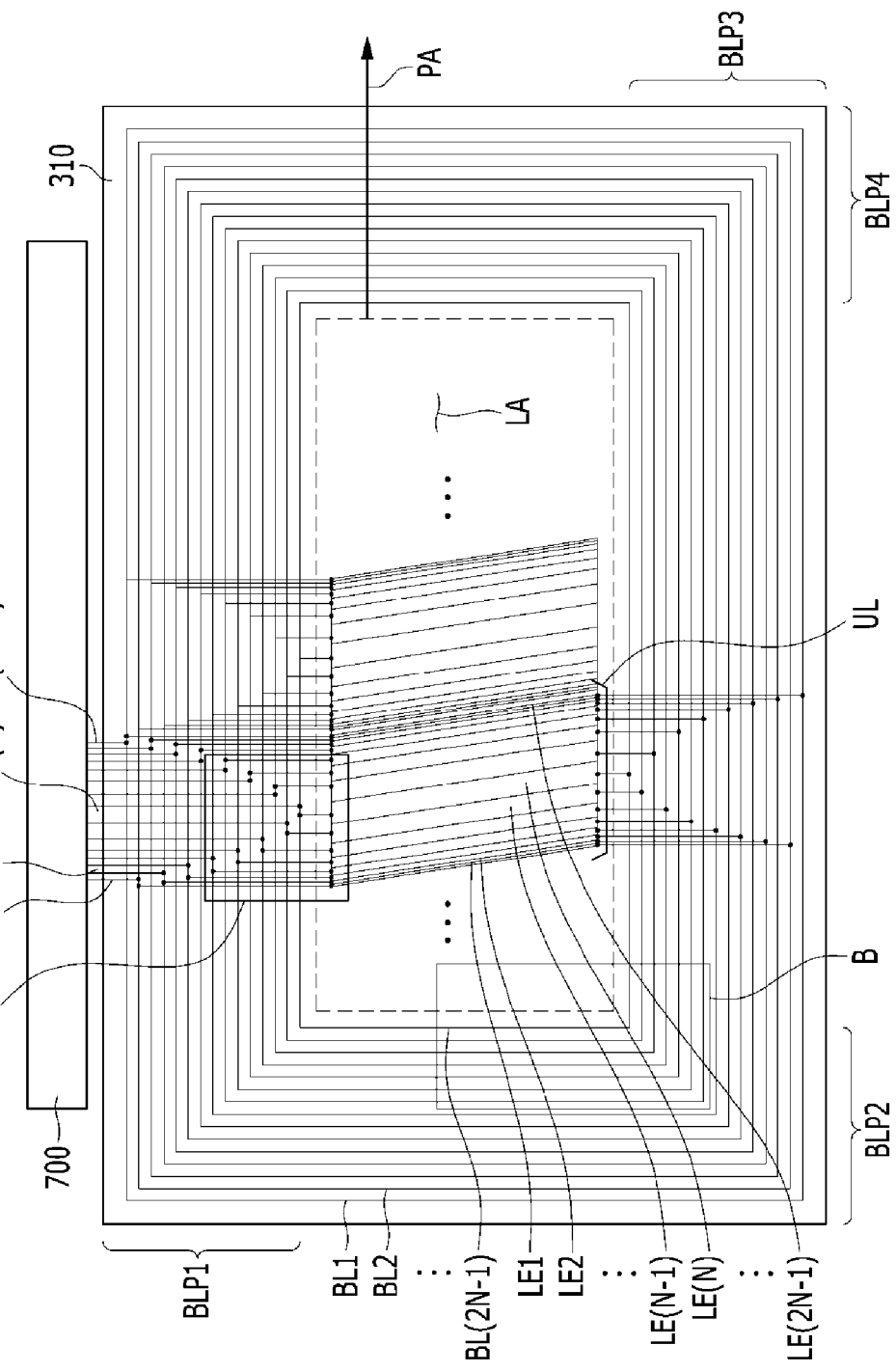
FIG. 2 schematically shows a connection relationship between a bus line, a lens electrode, and a lens driver in a lens panel of FIG. 1.
Figure 3A:
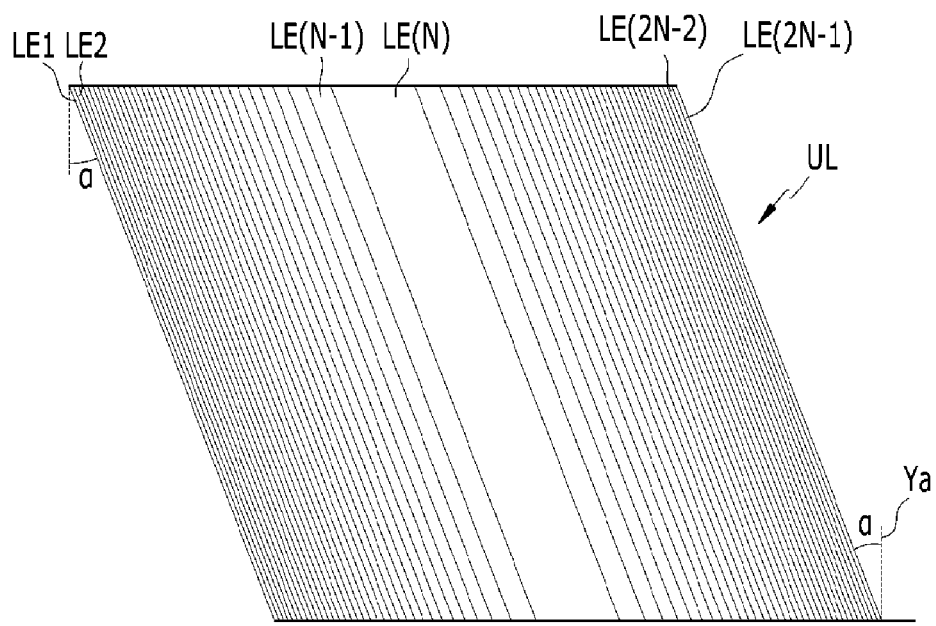
FIG. 3A is a top plan view and FIG. 3B and FIG. 3C are cross-sectional views of a unit electrode according to an exemplary embodiment of the present disclosure, respectively.
Figure 3B:
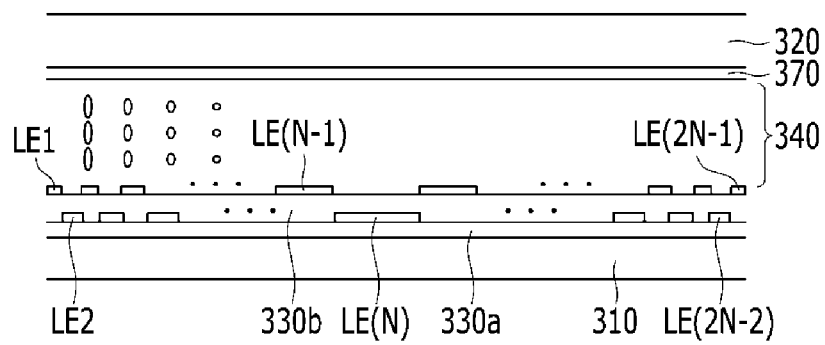
Figure 3C:
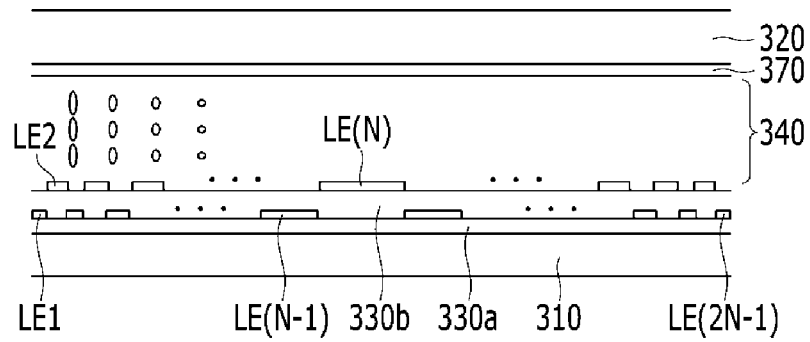
Figure 4:
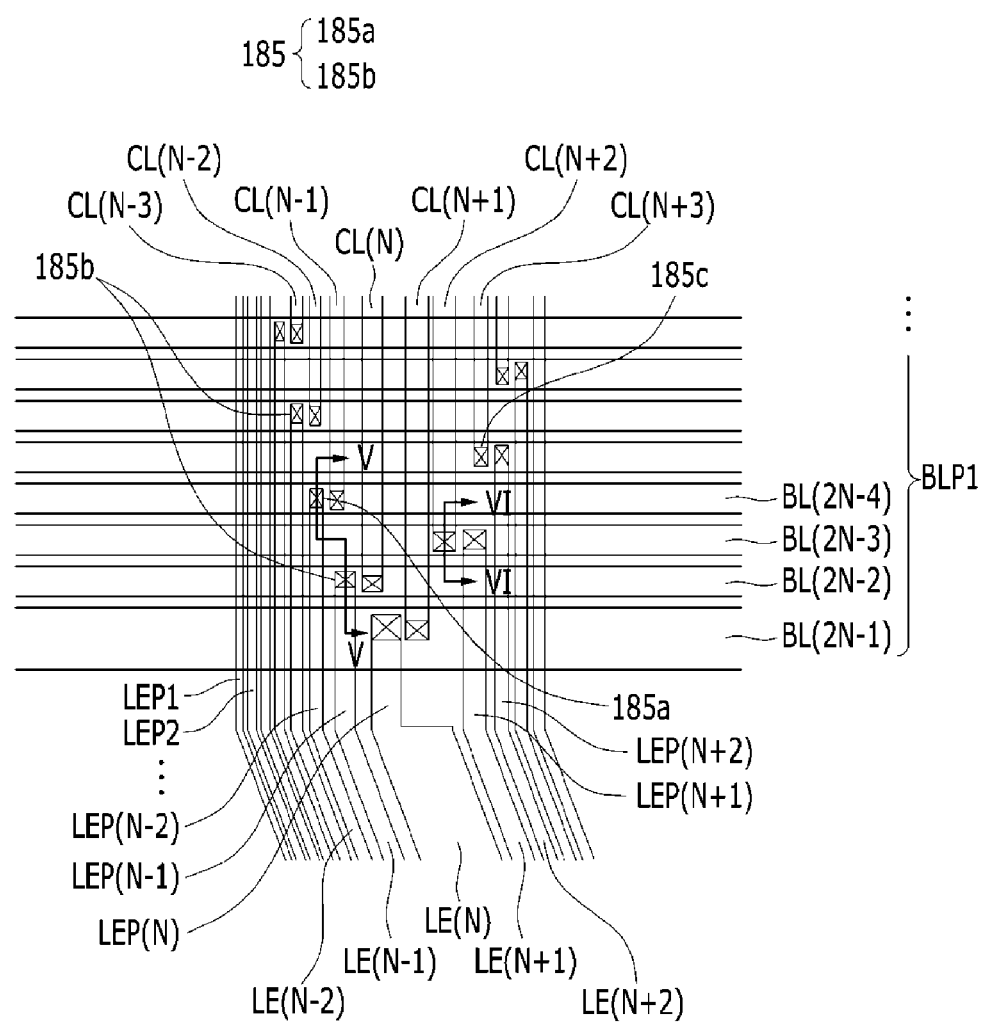
FIG. 4 is an enlarged top plan view of the area A of FIG. 2.
Figure 5:
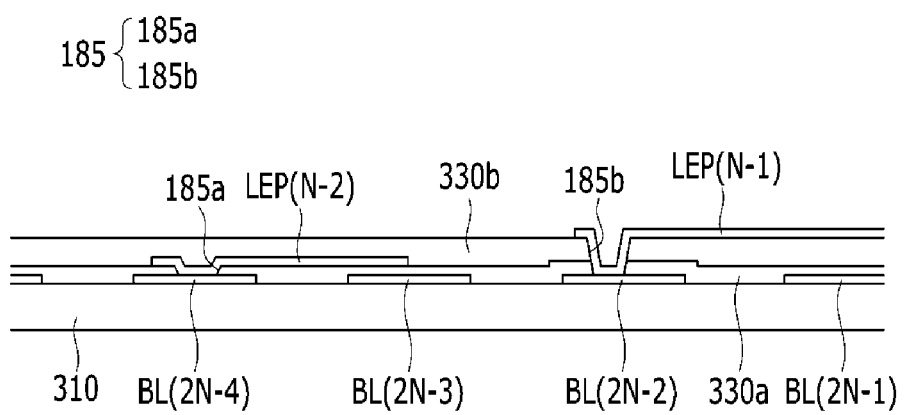
FIG. 5 is a cross-sectional view of FIG. 4, taken along the line V-V.
Figure 6:
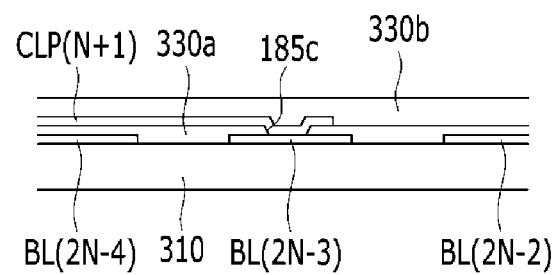
FIG. 6 is a cross-sectional view of FIG. 4, taken along the line VI-VI.
Figure 7:
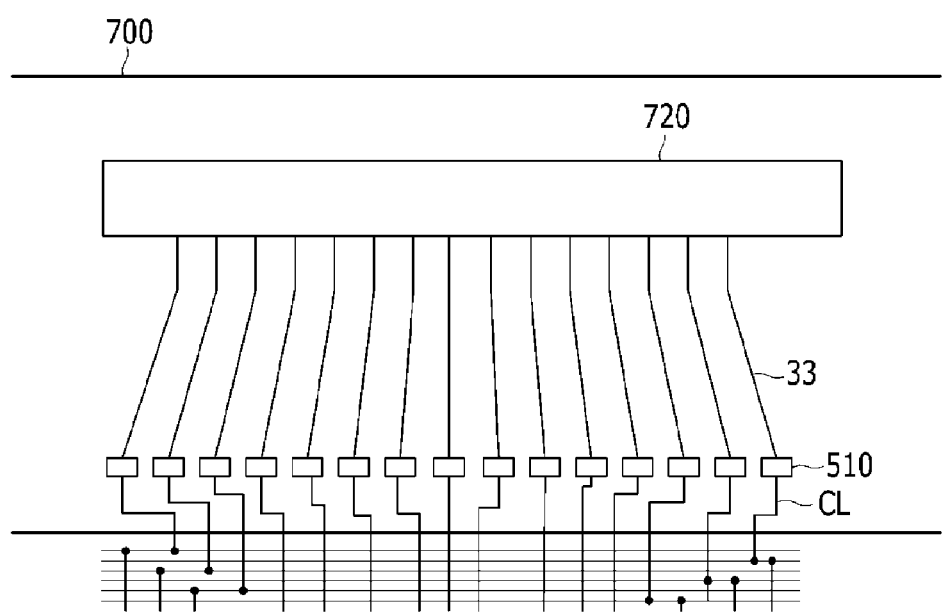
FIG. 7 shows a connection relationship between the lens driver and the bus line.

FIG. 2 schematically shows a connection relationship between bus lines BL, lens electrodes LE, and the lens driver 700 in the lens panel 300 of FIG. 1. FIG. 3A is a top plan view of a unit electrode UL according to the exemplary embodiment of the present disclosure, and FIG. 3B and FIG. 3C are cross-sectional views of the unit electrode UL according to the exemplary embodiment of the present disclosure. FIG. 4 is an enlarged top plan view of the area A of FIG. 2. FIG. 5 is a cross-sectional view of FIG. 4, taken along the line V-V. FIG. 6 is a cross-sectional view of FIG. 4, taken along the line VI-VI. FIG. 7 shows a connection relationship between the lens driver and the bus lines.

Referring to FIG. 2, a first substrate 310 of the lens panel 300 can realize a lens shape for controlling alignment dispersion of liquid crystal, and may be divided into a lens area LA that can display a stereoscopic image and a peripheral area PA disposed at the periphery of the lens area LA that does not display an image. As shown in FIG. 2, an area inside the dotted line is the lens area LA and the area outside the dotted line is the peripheral area PA.

The unit electrode UL includes a plurality of lens electrodes LE1, LE2, . . . , LE(N−1), . . . , LE(2N−1) (N is a natural number) (hereinafter denoted as LE) disposed on the first substrate 310, and the plurality of lens electrodes LE are disposed in the lens area LA. As shown in FIG. 3, the plurality of lens electrodes LE are inclined with a first angle α with respect to a vertical axis.

A plurality of bus lines BL1, BL2, . . . , BL(2N−1) (hereinafter denoted as BL) are arranged in the peripheral area PA. The number of bus lines may change according to the number of lens electrodes LE that form the unit lens UL. The plurality of bus lines BL include an upper bus line portion BLP1, a left bus line portion BLP2, a lower bus line portion BLP3, and a right bus line portion BLP4. As shown in FIG. 2, the upper bus line portion BLP1 and the lower bus line portion BLP3 are located in long sides of the peripheral area PA, and the left bus line portion BLP2 and the right bus line portion BLP4 are located in short sides of the peripheral area PA.

The plurality of bus lines BL according to a present exemplary embodiment continuously surround the lens area LA. In detail, the upper bus line portion BLP1, the left bus line portion BLP2, the lower bus line portion BLP3, and the right bus line portion BLP4 are connected with each other such that they form continuous lines, and as shown in FIG. 2, the overall shape of the plurality of the bus lines BL is substantially rectangular. That is, each of the plurality of bus lines BL is a single route.

The plurality of bus lines BL may have a lower resistance compared to the lens electrodes LE, and may include an opaque material such as copper, aluminum, etc.

In a present exemplary embodiment, the lens driver 700 is disposed in the peripheral area PA adjacent to the upper bus line portion BLP1. The lens driver 700 may include one printed circuit board PCB and at least one driving channel portion. The lens driver 700 is disposed at one long side of the peripheral area PA. The driving channel portion of the lens driver 700 may have a plurality of driving channels. Each of the plurality of driving channels is connected to the upper bus line portion BLP1 through connection lines CL1, CL2, . . . CL(N), . . . , CL(2N-1) (hereinafter denoted as CL). This will be described in detail below with reference to FIG. 7.

The respective lens electrodes LE of the unit lens UL may be electrically connected with the upper bus line portion BLP1 through contact holes. This will be described in detail below with reference to FIG. 3 to FIG. 6.

The lens electrodes LE of the unit lens UL and the plurality of bus lines BL are also electrically connected with each other in the lower bus line portion BLP3 where the lens driver 700 is not disposed. Thus, one end of the lens electrode EL is connected with the bus line BL in the upper bus line portion BLP1, and the other end of the lens electrode LE is connected with the bus line BL in the lower bus line portion BLP3. The bus lines BL connected with the lens electrode LE in the upper bus line portion BLP1 and the bus line BL connected with the lens electrode LE in the lower bus line portion BLP3 are connected with each other such that one route is formed. As described, each bus lines BL is connected with the same lens electrode LE in the upper and lower portions so that when a voltage is applied, dual driving can be realized. Therefore, although the lens panel 300 is increased in size, an RC delay can be decreased.

The unit electrode UL will now be described in further detail. FIG. 3A is a top plan view of the unit lens UL, and FIG. 3B and FIG. 3C are cross-sectional views of the unit lens UL.

Referring to FIG. 3A and FIG. 3B, a first insulating layer 330a is disposed on the first substrate 310, and a plurality of first electrodes LE2, LE4, . . . , LE(2N-2) (hereinafter denoted as L1) are located on the first insulating layer 330a. A second insulating layer 330b is disposed on the first electrodes L1, and a plurality of second electrodes LE1, LE3, . . . , LE(2N-1) (hereinafter denoted as L2) are located on the second insulating layer 330b. Since the second insulating layer 330b is provided between the first electrodes L1 and the second electrodes L2, the first electrodes L1 and the second electrodes L2 are electrically insulated from each other. In FIG. 3B, the first electrodes L1 and the second electrodes L2 are located in different layers, but they may be located in the same layer if insulated from each other.

The first electrodes L1 and the second electrodes L2 may be misaligned with each other. To prevent an occurrence of a moiré phenomenon, the first electrodes L1 and the second electrodes L2 may be included at about a first angle α with reference to a vertical axis Ya. The first angle α may be greater than about 8 degrees and less than about 10 degrees to maintain uniformity of luminance.

A middle electrode LE(N) (N is a natural number) is located at the center of the unit lens UL, and the first electrodes L1 and the second electrodes L2 may be bilaterally symmetric with reference to the middle electrode LE(N).

In FIG. 3B, the middle electrode LE(N) is located in the same layer as the first electrodes L1 only when N is an even number. When N is an odd number, as shown in FIG. 3B, the middle electrode LE(N) may be located in the same layer as the second electrodes L2.

The first electrodes L1, the second electrodes L2, and the middle electrode LE(N) may include a transparent conductive oxide material. For example, the first electrodes L1, the second electrodes L2, and the middle electrode LE(N) may include indium zinc oxide (IZO) or indium tin oxide (ITO).

The first insulating layer 330a and the second insulating layer 330b may include an insulating material that transmits light. For example, the first insulating layer 330a and the second insulating layer 330b may include a silicon oxide (SiOx) or a silicon nitride (SiNx). A common electrode 370 is located on a second substrate 320. The common electrode 370 may include a transparent conductive oxide material, and for example may include indium zinc oxide (IZO) or indium tin oxide (ITO).

A liquid crystal layer 340 is provided between the first substrate 310 and the second substrate 320, and the common electrode 370, together with the first electrodes L1, the second electrodes L2, and the middle electrode LE(N), can rearrange liquid crystal molecules of the liquid crystal layer 340. Accordingly, the first electrodes L1, the second electrodes L2, the middle electrode LE(N), the common electrode 370, and the liquid crystal layer 340 form the unit lens UL. In addition, an alignment layer may be disposed on the common electrode 370 and the first electrodes L1. The alignment layer may be rubbed or photo-aligned, and a rubbing or photo-alignment direction of the alignment layer may be the same as a direction along which the first electrodes L1, the second electrodes L2, and the middle electrode LE(N) are inclined with respect to the first angle α.

When a driving voltage is applied to the lens panel 300, an electric field is generated between the first electrodes L1, the common electrode 370, and the second electrodes L2, and the liquid crystal molecules of the liquid crystal layer 340 rearrange so that the unit lens UL may have the same phase difference variation as that of a Fresnel lens.

Hereinafter, the connection relationship between the bus lines BL and the lens electrodes LE will be described in detail with reference to FIG. 2, FIG. 4, and FIG. 5.

Referring to FIG. 2, FIG. 4, and FIG. 5, the lens electrodes LE of the unit lens UL are bent at ends that are adjacent to the upper bus line portion BLP1 and then connected to lens electrode extension portions LEP that cross the upper bus line portion BLP1. The lens electrodes LE and the lens electrode extension portion LEP may be formed through a same process with a same material.

Referring to FIG. 4 and FIG. 5, the bus lines BL are located on the first substrate 310 and extend in parallel along a horizontal direction. The first insulating layer 330a is disposed on the bus lines BL, and first lens electrode extension portions LEP2, LEP4, . . . , LEP(2N–2) (hereinafter denoted as LP1) that correspond to the first electrodes L1 are located on the first insulating layer 330a. The first lens electrode extension portions LP1 may be electrically connected with the bus lines BL through contact holes formed in the first insulating layer 330a. For example, as shown in FIG. 5, a lens electrode extension portion LEP (N–2) is electrically connected with a bus line BL(2N–4) through a first contact hole 185a. Each of the respective lens electrodes LE of the unit lens UL may be connected with a single bus line BL of the upper bus line portion BLP1 through the lens electrode extension portion LEP.

The second insulating layer 330b is disposed on the first lens electrode extension portion LEP2, LEP3, . . . , LEP (2N–2) (hereinafter denoted as LP1), and second lens electrode extension portions LEP1, LEP3, . . . , LEP(2N–1) (hereinafter denoted as LP2) corresponding to the second electrodes L2 are located on the second insulating layer 330b. The second lens electrode extension portions LP2 may be electrically connected with the bus lines BL through contact holes formed through the first insulating layer 330a and the second insulating layer 330b. For example, as shown in FIG. 5, a lens electrode extension portion LEP(N–1) is connected with a bus line BL(2N–2) through a second contact hole 185b.

Referring back to FIG. 2 and FIG. 4, the middle electrode LE(N) is connected with a bus line BL(2N–1) located at the innermost side of the upper bus line portion BLP1. A lens electrode extension portion LEP(N–1) located at the left side of the middle electrode LE(N) is connected with a bus line BL(2N–2) adjacent to an upper side of a bus line BL(2N–1). A lens electrode extension portion LEP(N+1) located at the right side of the middle electrode LE(N) is connected with a bus line BL(2N–3) adjacent to an upper side of the previously stated bus line BL(2N–2). With such a pattern, as shown in FIG. 2 and FIG. 4, the first contact hole 185a and the second contact hole 185b through which the bus lines BL and the lens electrode extension portions LEP are connected may have a substantially V-shaped contact hole 185 pattern.

Hereinafter, a connection relationship between the bus lines BL and the driver 700 will be described in detail with reference to FIG. 2, FIG. 4, FIG. 6, and FIG. 7.

Referring to FIG. 2, FIG. 4, FIG. 6, and FIG. 7, the bus lines BL are located on the first substrate 310 and extend in parallel along a horizontal direction. The first insulating layer 330a is disposed on the bus lines BL, and connection lines CL connected to the lens driver 700 are located on the first insulating layer 330a. The connection lines CL extend in parallel while crossing the bus lines BL. In further detail, as shown in FIG. 7, the connection lines CL are connected to a driving channel portion 720. The driving channel portion 720 includes a plurality of channels, and each channel is connected with a driving pad wire 33. The driving pad wires 33 may be spaced apart by a constant gap.

The driving pad wires 33 are connected with the connection lines CL through electrode connection portions 510. The electrode connection portions 510 connect the driving pad wires 33 and the connection lines CL. In general, since the driving pad wires 33 are made of a metallic material and the connection lines CL are made of a transparent conductive material, contact resistance can be reduced by expanding a contact area of the driving pad wires 33 and then using the electrode connection portions 510 for connection between different materials.

The number of electrode connection portions 510 is the same as the number of connection lines CL. The electrode connection portions 510 may be spaced apart by a constant gap.

The connection lines CL may be connected with the bus lines BL through the contact holes 185 formed in the first insulating layer 330a. For example, as shown in FIG. 6, a connection line CL(N+1) is electrically connected with a bus line BL(2N–3) through a third contact hole 185c.

The second insulating layer 330b is disposed on the connection lines CL. In a present exemplary embodiment, the connection lines CL are located between the first insulating layer 330a and the second insulating layer 330b, but the connection lines CL may be located on the second insulating layer 330b, and in this case, the connection lines CL may be connected with the bus lines BL through a contact hole formed through the first and second insulating layers 330a and 330b.

Figure 8:
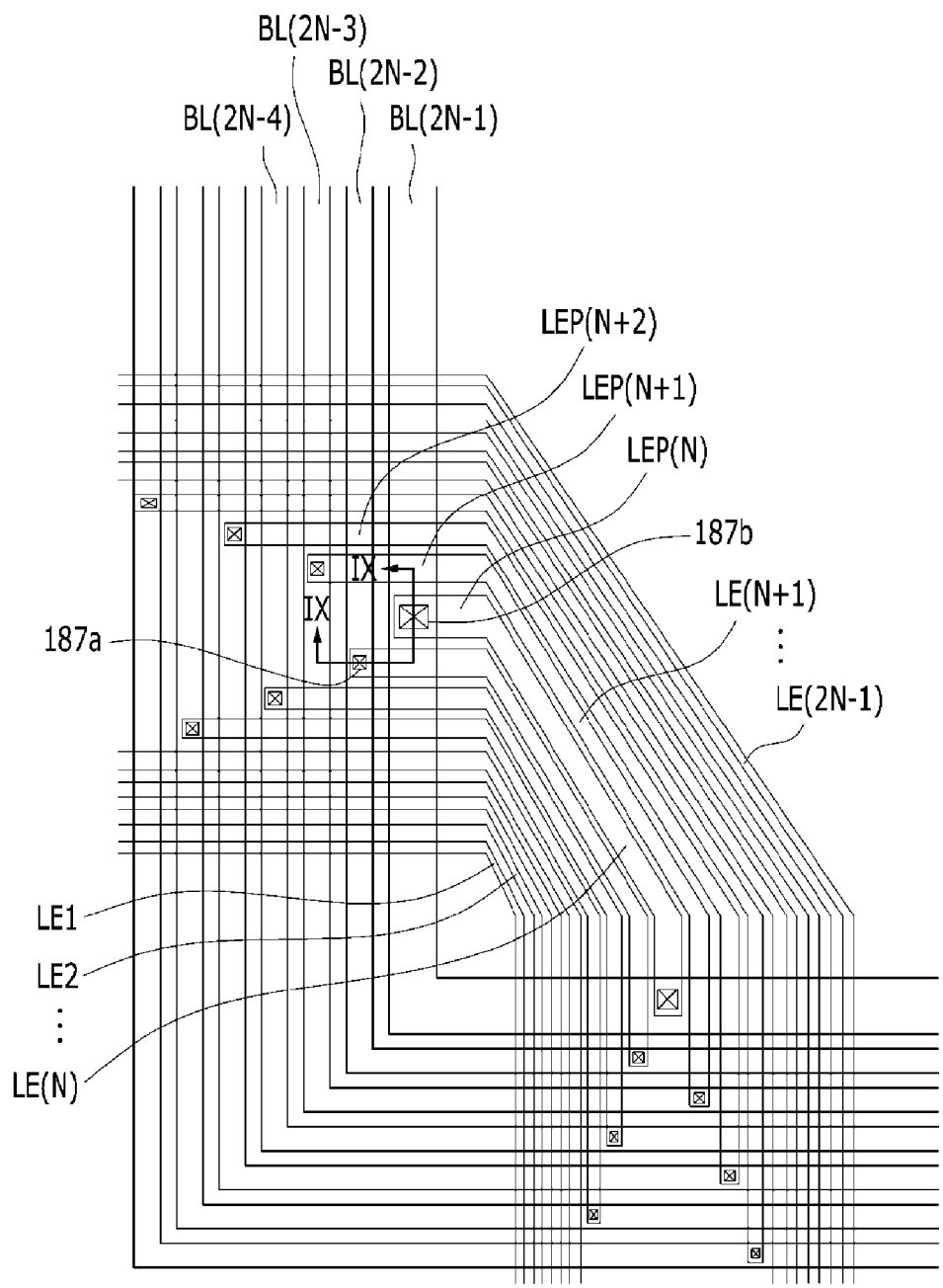
FIG. 8 is an enlarged top plan view of the area B of FIG. 2.
Figure 9:
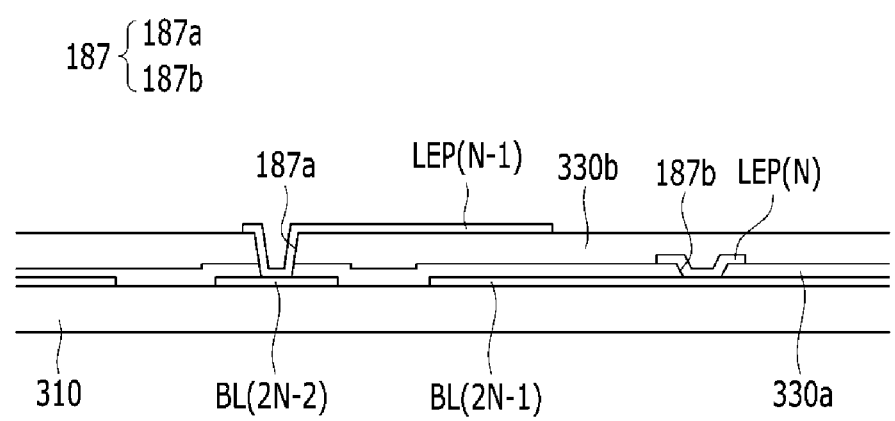
FIG. 9 is a cross-sectional view of FIG. 8, taken along the line IX-IX.

FIG. 8 is an enlarged top plan view of the area B of FIG. 2. FIG. 9 is a cross-sectional view of FIG. 8, taken along the line IX-IX.

The area B of FIG. 2 indicates the left side of the lens area LA, and a connection relationship between the lens electrodes LE and the left bus line BLP2 according to an exemplary embodiment of the present disclosure will be described with reference to FIG. 8.

Referring to FIG. 8, the lens electrodes LE are bent at ends thereof that are adjacent to the left bus line portion BLP2, and are then connected with the lens electrode extension portions LEP that cross the left bus line portion BLP2. The lens electrodes LE and the lens electrode extension portions LEP may be formed through a same process using a same material.

Referring to FIG. 8 and FIG. 9, bus lines BL are located on the first substrate 310 and extend in parallel along a vertical direction. The first insulating layer 330a is disposed on the bus lines BL, and lower lens electrode extension portion LEP is located on the first insulating layer 330a. The second insulating layer 330b is disposed on the lower lens electrode extension portion LEP and higher lens electrode extension portion LEP is located on the second insulating layer 330b.

The lower lens electrode extension portion LEP may be the first lens electrode extension portion LEP2, LEP4, LEP(2N–2) (hereinafter denoted as LP1) or the second lens electrode extension portions LEP1, LEP3, LEP(2N–1) (hereinafter denoted as LP2), and if the lower lens electrode extension portion LEP is the first lens electrode extension portion LP1, the higher lens electrode extension portion LEP is the second lens electrode extension portions LP2. The lower lens electrode extension portion LEP may be electrically connected with a bus line BL through a contact hole formed in the first insulating layer 330a, and the higher lens electrode extension portion LEP may be electrically connected with a bus line BL through a contact hole formed in the first insulating layer 330a and the second insulating layer 330b. As shown in FIG. 9, a lens electrode extension portion LEP(N–1) included in the higher lens electrode extension portion LEP is electrically connected with a bus line BL(2N–2) through a first contact hole 187a, and the middle electrode extension portion LEP(N) is electrically connected with a bus line BL(2N–1) through a second contact hole 187b formed in the first insulating layer 133a.

Each lens electrode LE of the unit lens UL may be connected with a bus line BL of the left bus line portion BLP2 through the lens electrode extension portion LEP.

The connection relationship between the lens electrodes LE and the left bus lines BLP2 is previously described with reference to FIG. 8 and FIG. 9, but a connection relationship between the lens electrodes LE and a right bus lines BLP4 may be formed with the same pattern as the connection relationship between the lens electrodes LE and the left bus lines BLP2.

Figure 10:
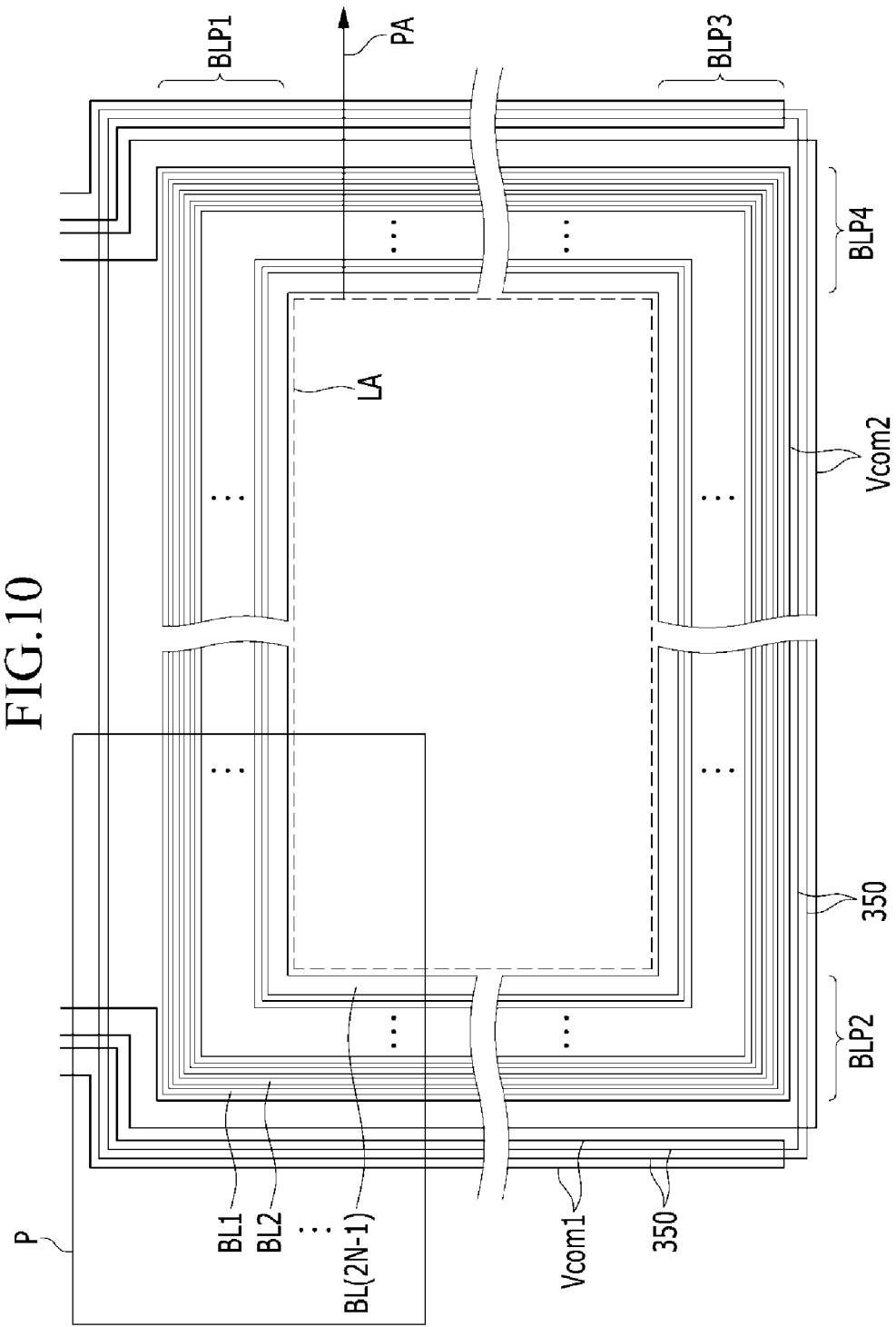
FIG. 10 is a top plan view of the bus line, a common electrode line, and a sealant of FIG. 2.
Figure 11:
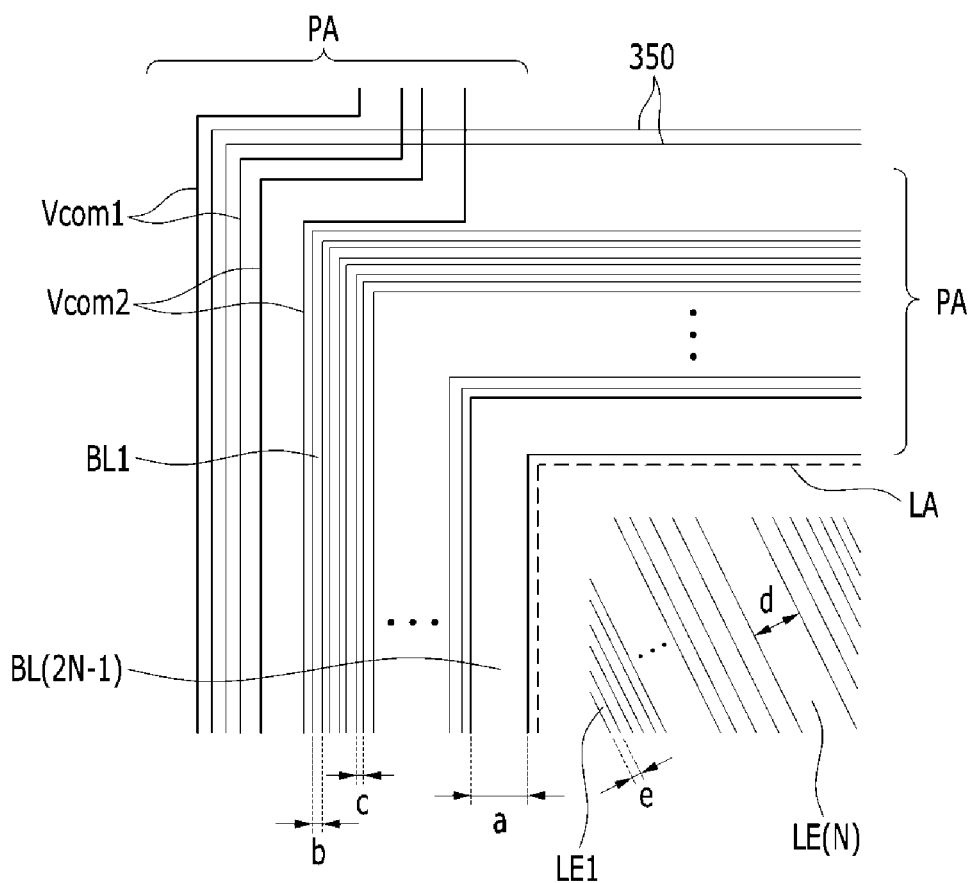
FIG. 11 is an enlarged view of the area P of FIG. 10.

FIG. 10 is a top plan view of the bus line, the common electrode line, and a sealant of the lens panel of FIG. 2. FIG. 11 is an enlarged view of the area P of FIG. 10. Referring to FIG. 10 and FIG. 11, the plurality of bus lines BL, a sealant 350, and common electrode lines Vcom1 and Vcom2 are located in the peripheral area PA. The sealant 350 bonds the first substrate 310 and the second substrate 320 shown in FIG. 3B to each other at an edge portion of the lens panel 300.

The common electrode lines Vcom1 and Vcom2 include a first common electrode line Vcom1 and a second common electrode line Vcom2. The first common electrode line Vcom1 surrounds the peripheral area PA on left and right sides thereof, and overlaps the sealant 350. The second common electrode line Vcom2 surrounds the peripheral area at left, right, and bottom sides thereof. The second common electrode line Vcom2 is located inward from the first common electrode line Vcom1 on the left and right sides, and does not overlap the sealant 350. However, the second common electrode line Vcom2 may overlap the sealant 350 at a lower end of the peripheral area PA. The common electrode lines Vcom1 and Vcom2 will be described in detail with reference to FIG. 15 to FIG. 18.

Among the plurality of bus lines BL according to a present exemplary embodiment, a bus line BL(2N-1) located closest to the lens area LA will be described. The bus line BL(2N-1) will be referred to as an X bus line. The X bus line BL(2N-1) may be connected to the middle electrode LE(N) located in the center of the lens electrodes LE.

In a present exemplary embodiment, remaining bus lines, excluding the X bus line BL(2N-1) will be referred to as Y bus lines BL1, BL2, ..., BL(2N-2). Referring now to FIG. 11, let the width of the X bus line BL(2N-1) be a first width a and the width of an outermost Y bus line BL1 be a second width b, it may be seen that the first width a is greater than the second width b. Here, the width of each of the Y bus lines BL2, BL3, BL(2N-1) located between the X bus line BL(2N-1) and the outermost bus line BL1 may be the second width b. The first width a of the X bus line BL(2N-1) is greater than the second width b to minimize a resistance difference between the X bus line BL(2N-1) and the middle electrode LE(N) of FIG. 4 connected to the X bus line BL(2N-1). In this case, every neighboring bus line of the plurality of bus lines BL may be separated by the same gap c.

Referring again to FIG. 11 and letting a width of the middle electrode LE(N) of the unit lens UL be a third width d and a width of a leftmost lens electrode LE1 of the unit lens UL be a fourth width e, it may be seen that the third width d is greater than the fourth width e. In the unit lens UL, the widths of the lens electrodes LE1, LE2, ..., LE(N-1) gradually increase from the leftmost lens electrode LE1 to the middle electrode LE(N).

In a present exemplary embodiment, the X bus line BL(2N-1) is electrically connected to the middle electrode LE(N), and the first width a of the X bus line BL(2N-1) is greater than the third width d of the middle electrode LE(N).

In a present exemplary embodiment, a ratio of the first width a of the X bus line BL(2N-1) with respect to the second width b of the Y bus lines BL2, BL3, BL(2N-2) may be greater than 20:1. This range will be described with reference to data measured in FIG. 12 and FIG. 13.

Figure 12:
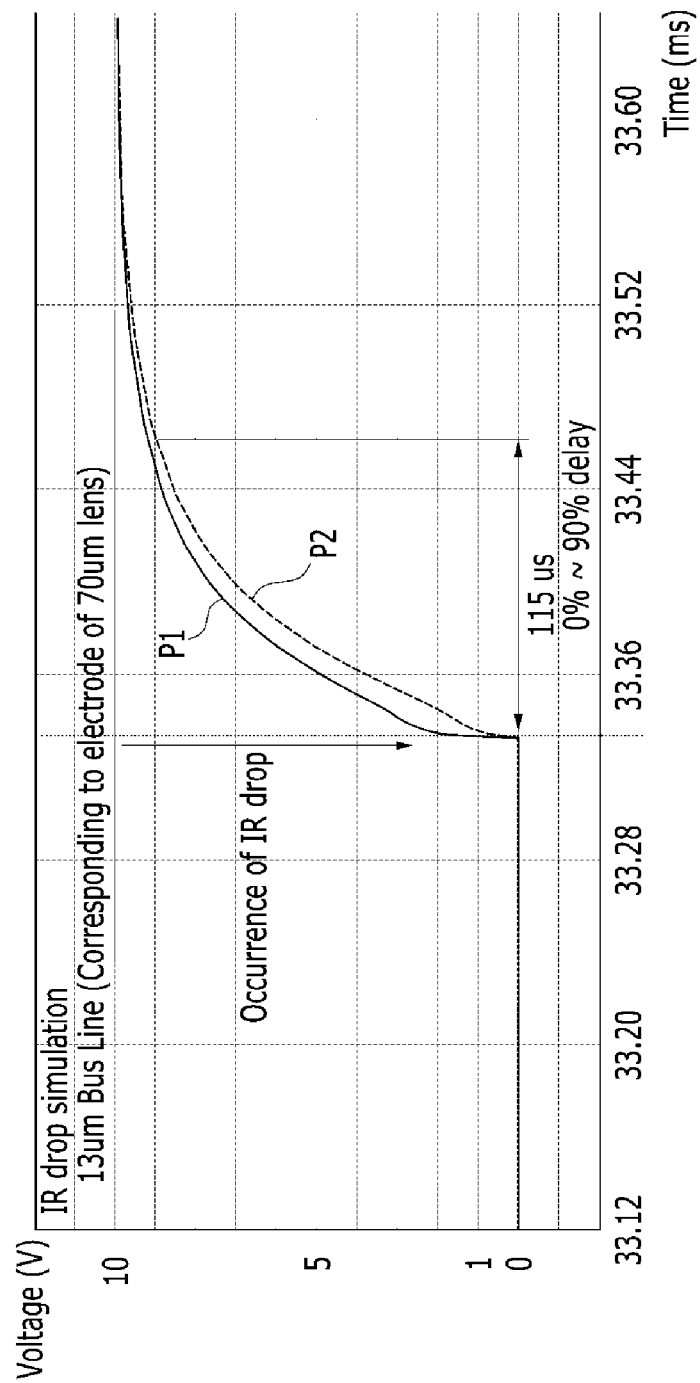
FIG. 12 is a graph of a simulation result of a voltage waveform from driving a display device according to a comparative example.

FIG. 12 is a graph of a simulation result of a voltage waveform from driving a display device according to a comparative example.

FIG. 12 is a graph of a simulation result of voltage application in a case of a 13 μm wide bus line connected to a 70 μm wide middle electrode LE(N). Referring to FIG. 12, a first comparative example P1 shows a result of a measurement at a point in a left bus line portion in a 13 μm wide bus line that surrounds a lens area, and a second comparative example P2 shows a result of a measurement at a point located in a lower bus line portion.

The first comparative example P1 and the second comparative example P2 both experience a voltage drop (IR drop). Referring back to FIG. 2, a plurality of unit electrodes UL are located in one lens area LA, and the middle electrode LE(N) is located in the center portion of each unit electrode UL. A plurality of middle electrodes, one for each unit electrode UL, are connected to one bus line BL, and the plurality of middle electrodes LE(N) are substantially connected in parallel with each other. Thus, resistance gradually decreases as the number of middle electrodes LE(N) increases.

Figure 13:
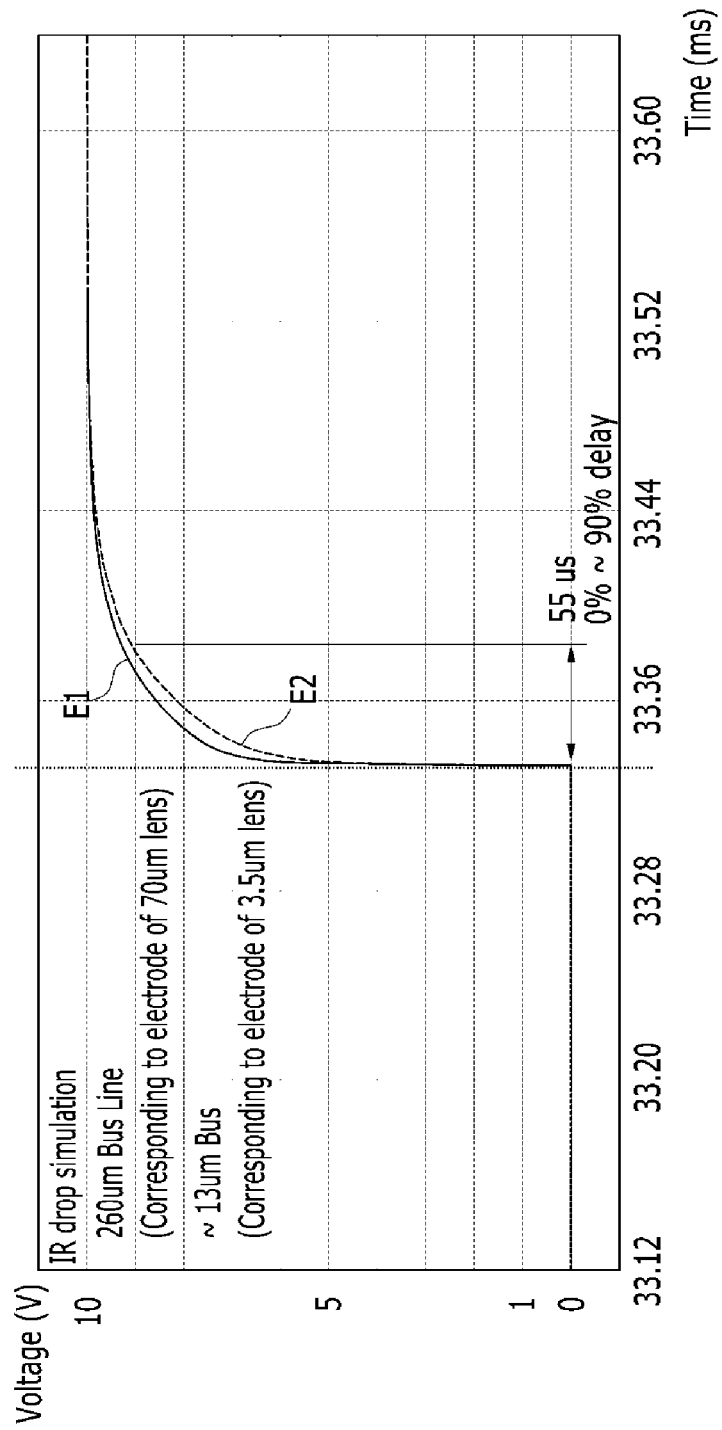
FIG. 13 is a graph of a simulation result of a voltage waveform from driving a display device according to an exemplary embodiment of the present disclosure.

FIG. 13 is a graph of a simulation result of a voltage waveform from driving a display device according to an exemplary embodiment of the present disclosure.

FIG. 13 is a graph of a simulation result of voltage application in a case of a 260 μm wide bus line connected to a 70 μm wide middle electrode LE(N) and a 13 μm wide bus line connected to a 3.5 μm wide middle electrode LE(N). Referring to FIG. 13, a first exemplary embodiment E1 shows a result of a measurement at a point in a left bus line portion in bus lines that surround a lens area, and a second exemplary embodiment E2 shows a result of a measurement at a point in a lower bus line portion. The first exemplary embodiment E1 and the second exemplary embodiment E2 show the same voltage waveform.

Referring to FIG. 13, a voltage drop (IR drop) is reduced compared to the comparative example of FIG. 12. As described, the following ratios may satisfy Equation (1) to reduce the voltage drop.

$$Lx:Bx = Ly:By \qquad \text{Equation (1)}$$

Here, Lx denotes the minimum width of a lens electrode, Bx denotes the minimum width of a bus line corresponding to the minimum width of the lens electrode, Ly denotes the maximum width of a lens electrode, and By denotes the maximum width of a bus line corresponding to the maximum width of the lens electrode.

The maximum width By of the bus line may be set within a range that allows a voltage drop as given in Equation 2.

$$0.5*(Ly*Bx)/Lx < By \le (Ly*Bx)/Lx \qquad \text{Equation 2}$$

Referring back to FIG. 11, the third width d of the middle electrode LE(N) in the present exemplary embodiment may be 70 μm based on the simulation result, and the fourth width e of the lens electrode LE1 farthest from the middle electrode LE(N) may be 3.5 μm. A ratio of the third width d and the fourth width e is 20:1. Like the width of the lens electrode LE, a ratio of the first width of the X bus line BL(2N-1) to the second width b of the Y bus lines BL2, BL3, BL(2N-2) may be 20:1.

Figure 14:
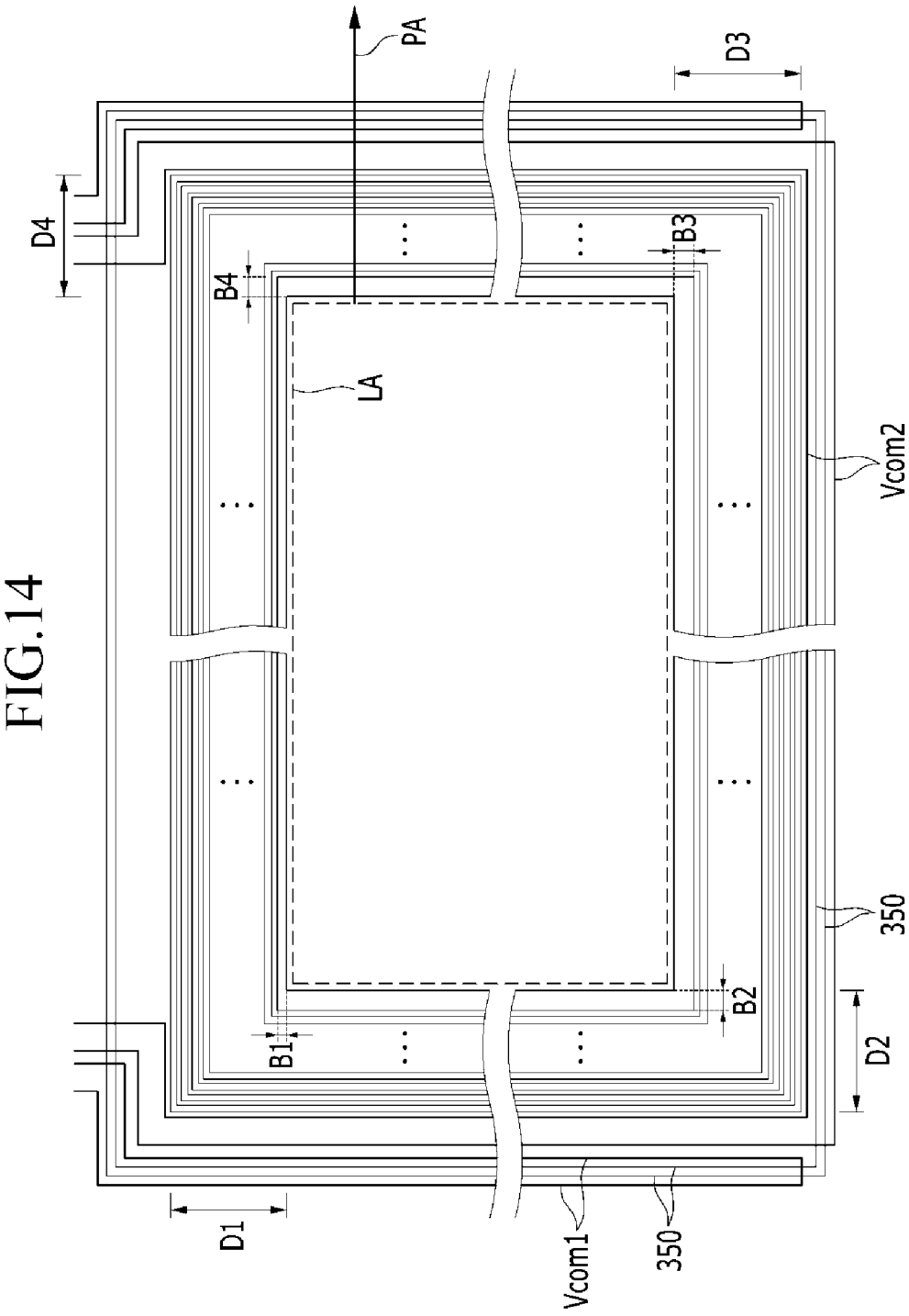
FIG. 14 is a top plan view of a bus line structure of a lens panel of a display device according to an exemplary variation of FIG. 10.

FIG. 14 is a top plan view of a bus line structure of a lens panel in a display device according to an exemplary variation of FIG. 10.

The exemplary embodiment of FIG. 14 is similar to the exemplary embodiment of FIG. 10. Therefore, only a different portion will be described.

Referring to FIG. 14, let the width of an upper bus line portion BLP1 be set to a first width D1, the width of a left bus line portion BLP2 be set to a second width D2, the width of a lower bus line BLP3 be set to a third width D3, and the width of a right bus line portion BLP4 be set to D4, then the first width D1 may be smaller than the third width D3 and the second width D2 may be equivalent to the fourth width D4. This is because the width of an X bus line BL(2N−1) is different on each side of a peripheral area PA. Let the width of the X bus line BL(2N−1) located in the upper side of the lens area LA be a first width B1, the width of the X bus line BL(2N−1) located in the left side be a second width B2, the width of the X bus line BL(2N−1) located in the lower side be a third width B3, and the width of the X bus line BL(2N−1) located in the right side be a fourth width B4, then the first width B1 is smaller than the second, third, and fourth widths B2, B3, and B4 in a present exemplary embodiment. Let at least one of the first width B1, the second width B2, the third width B3, and the fourth width B4 be By1, then By1 may be the maximum width By of a bus line in Equation 2. In addition, let Bx1 be the minimum Bx of the bus line in Equation 1 and Equation 2. Then, Bx1 is smaller than By1

A portion of the X bus line BL(2N−1) having the first width B1 is disposed in the peripheral area PA where the lens driver 700 is located. If in an exemplary variation the lens driver 700 of FIG. 2 is formed in a lower side of the lens area LA rather than in an upper side, a small width portion of the X bus line BL(2N−1) may be located in the lower side of the lens area LA. Since there is essentially no voltage drop in a bus line where the lens driver 700 of FIG. 2 is directly connected, the bus line may have a small width. However, when the width of a bus line in the opposite side of the lens driver 700 of FIG. 2 is small, an increase of RC delay and a voltage drop may occur. In a present exemplary embodiment, the width of the bus line connected to the middle electrode LE(N) can be reduced to compensate an increase in bezel size due to the lens driver 700 of FIG. 2.

Excluding the above-described difference, the description of FIG. 10 can be applied to the exemplary embodiment of FIG. 14.

Figure 15:
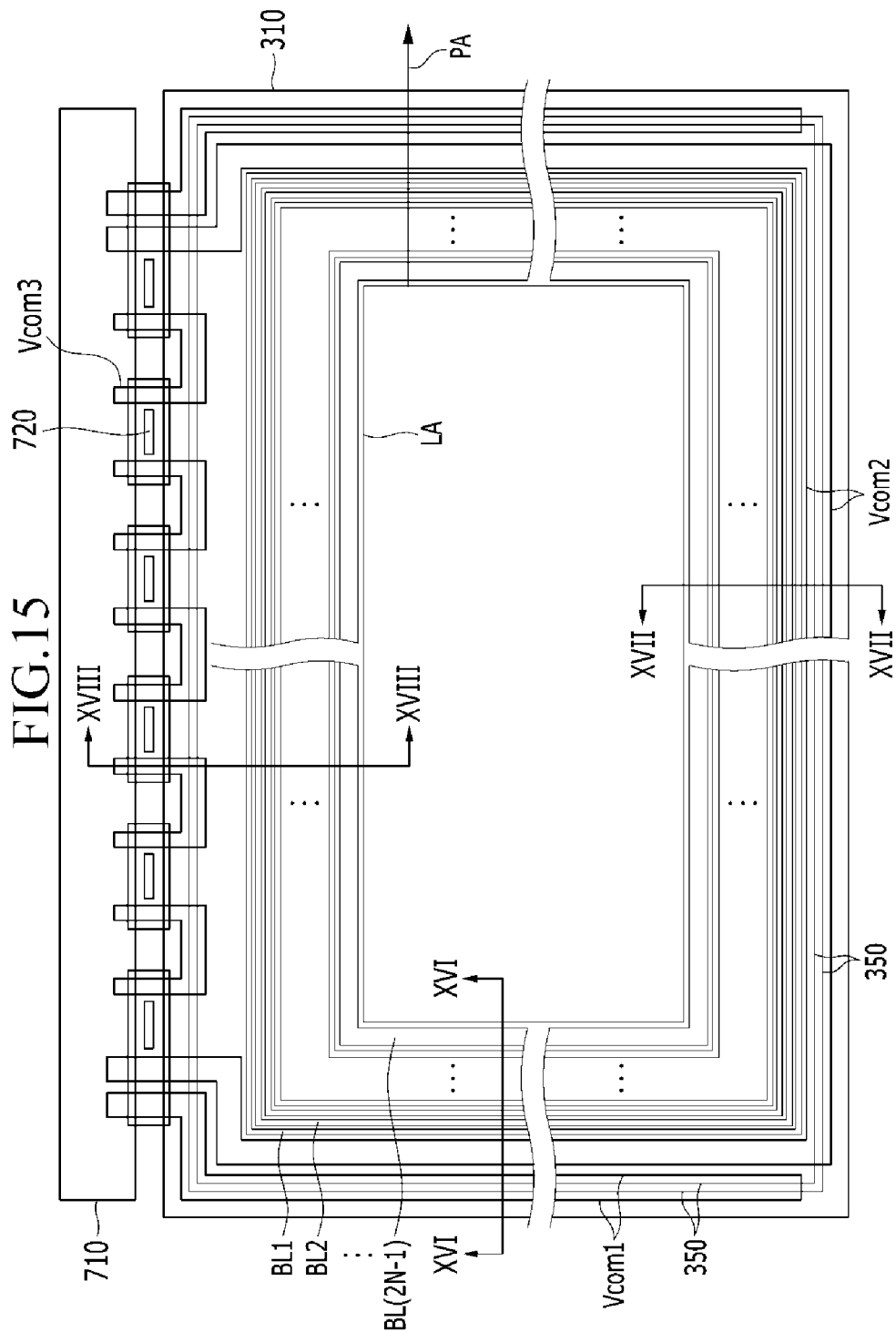
FIG. 15 is a top plan view of a common electrode line structure according to an exemplary embodiment of the present disclosure.
Figure 16:
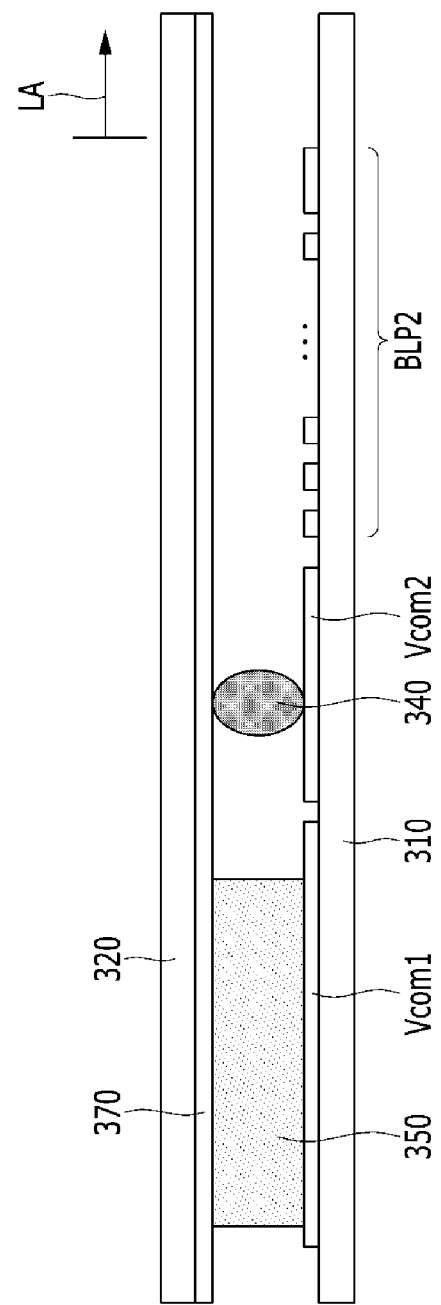
FIG. 16 is a cross-sectional view of FIG. 15, taken along the line XVI-XVI.
Figure 17:
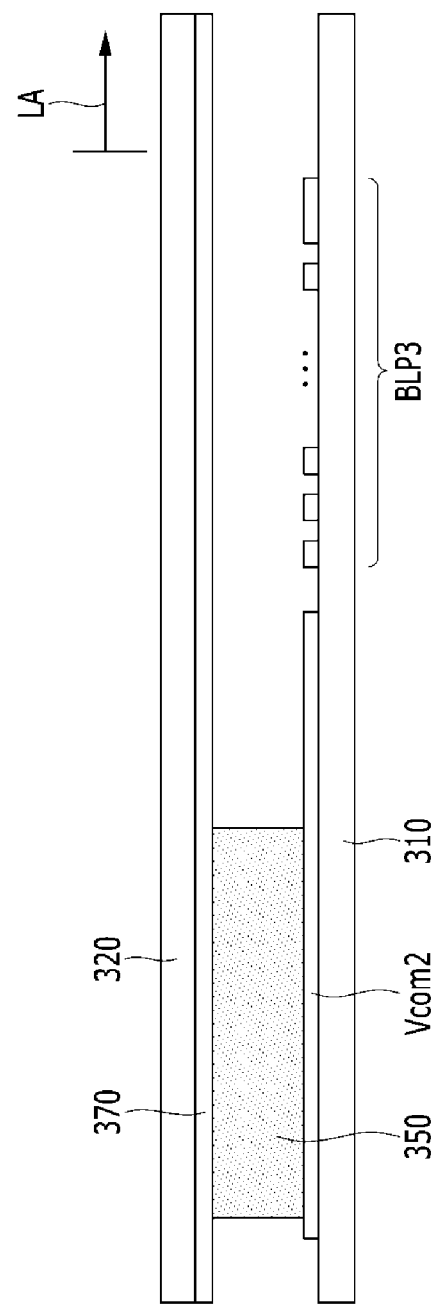
FIG. 17 is a cross-sectional view of FIG. 15, taken along the line XVII-XVII.
Figure 18:
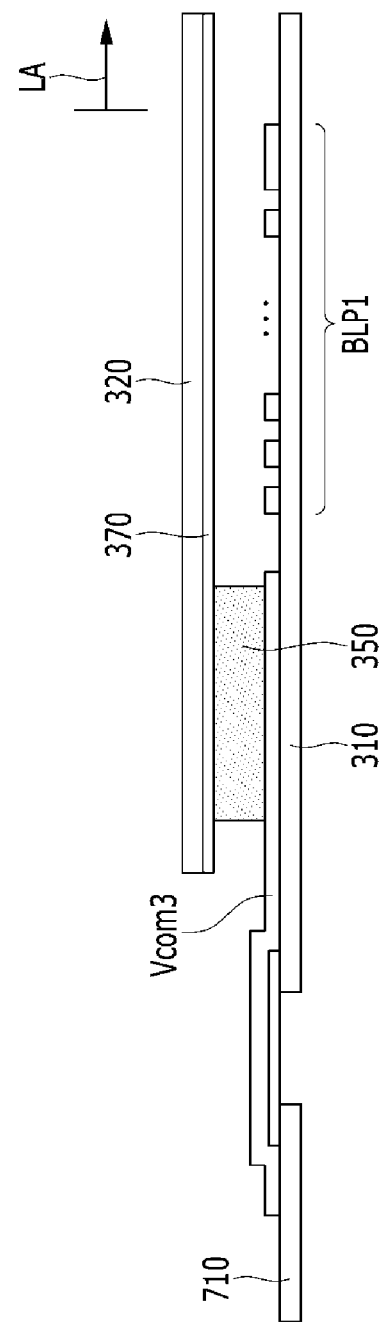
FIG. 18 is a cross-sectional view of FIG. 15, taken along the line XVIII-XVIII.

FIG. 15 is a top plan view of a common electrode line structure according to an exemplary embodiment of the present disclosure. FIG. 16 is a cross-sectional view of FIG. 15, taken along the line XVI-XVI. FIG. 17 is a cross-sectional view of FIG. 15, taken along the line XVII-XVII. FIG. 18 is a cross-sectional view of FIG. 15, taken along the line XVIII-XVIII.

Referring to FIG. 15, common electrode lines Vcom1 and Vcom2 are disposed outward from an area where the plurality of bus lines BL are arranged. The common electrode lines include first common electrode lines Vcom1 surrounding the bus lines BL on two sides, and second common electrode lines Vcom2 surrounding the bus lines BL on three sides. In addition, a third common electrode line Vcom3 may be additionally provided between driving channel portions 720. The third common electrode line Vcom3 may be provided between the respective driving channel portions 720.

Referring to FIG. 15 and FIG. 16, the left edge of a first substrate 310 is formed to substantially match the left edge of a second substrate. The first common electrode lines Vcom1 extend along the left side of a peripheral area PA and may overlap a sealant 350. The sealant 350 may include a conductive material, and may electrically connect the first common electrode lines Vcom1 and the common electrode 370. The second common electrode lines Vcom2 extend along the left side of the peripheral area PA parallel to the first common electrode lines Vcom1.

The second common electrode lines Vcom2 may be electrically connected with the common electrode 370 by a shorting bar 340. A plurality of shorting bars 340 may be provided separated from each other along a direction in which the second common electrode lines Vcom2 extend, and shorting points may be provided corresponding to the number of shorting bars 340.

Referring to FIG. 15 and FIG. 17, a lower edge of the first substrate 310 is formed to substantially match a lower edge of the second substrate 320. The second common electrode lines Vcom2 extend along the lower side of the peripheral area PA, and a part of the second common electrode lines Vcom2 may overlap the sealant 350. When the sealant 350 includes a conductive material, the second common electrode lines Vcom2 and the common electrode 370 are electrically connected to each other by the sealant 350, and when the sealant 350 includes an insulating material, an additional shorting bar may be provided to electrically connect the second common electrode lines Vcom2 and the common electrode 370.

Referring to FIG. 15 and FIG. 18, the third common electrode line Vcom3 extends from a printed circuit board (PCB) 710 to a portion of the first substrate 310 that overlaps the second substrate 320. The third common electrode line Vcom3 may overlap the sealant 350. The sealant 350 may include a conductive material and thus may electrically connect the third common electrode line Vcom3 and the common electrode 370.

The previously described first common electrode lines Vcom1, the second common electrode lines Vcom2, and the third common electrode lines Vcom3 may receive different voltages. As described, different voltages may be applied through the plurality of common electrode lines Vcom1, Vcom2, and Vcom3, and shorting points formed at various locations may improve a uniformity of a common voltage applied to the common electrode 370.

Figure 19:
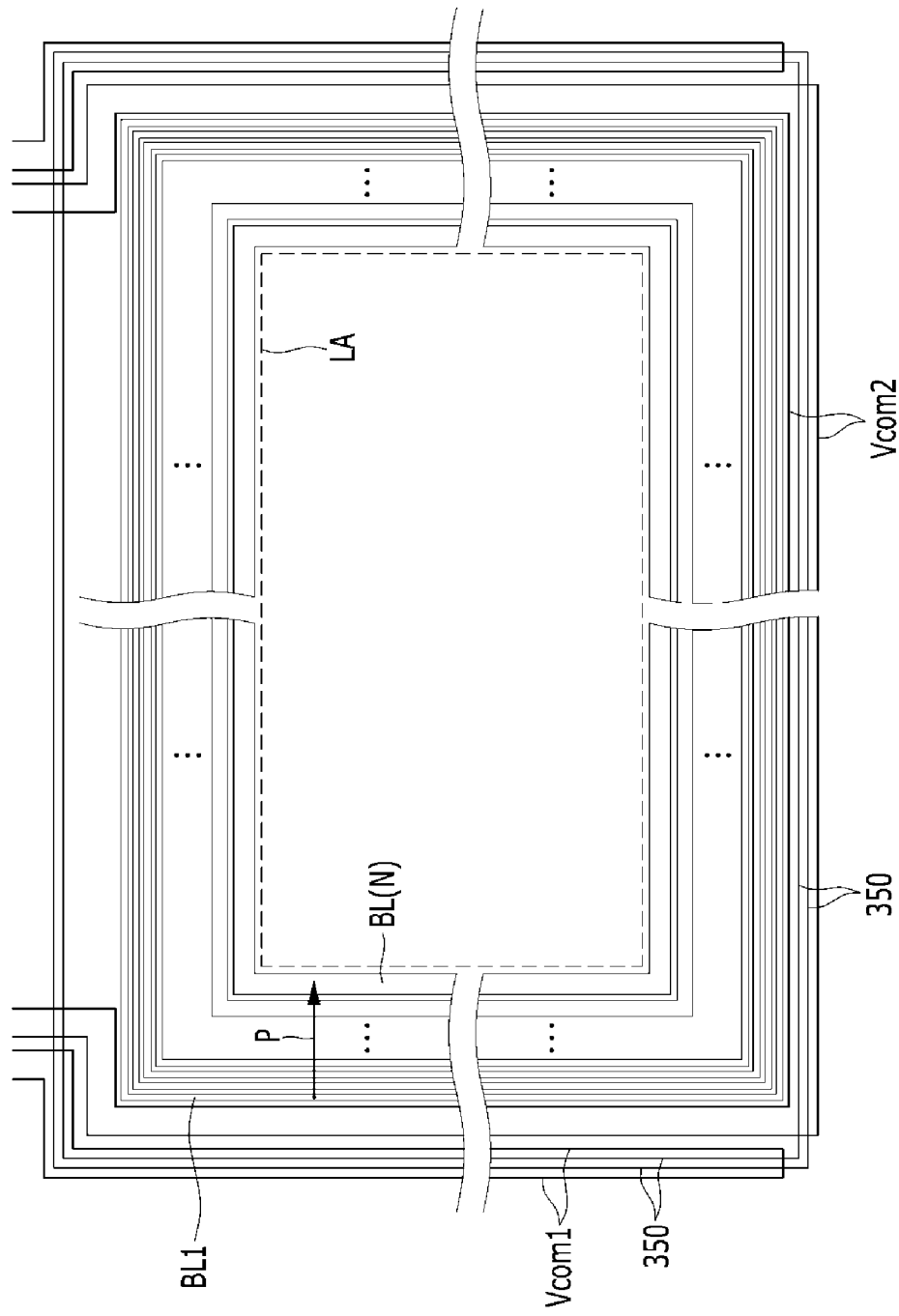
FIG. 19 is a top plan view of a bus line structure of a lens panel of a display device according to an exemplary variation of FIG. 10.

FIG. 19 is a top plan view of a bus line structure in a lens panel of a display device according to an exemplary variation of FIG. 10.

The exemplary embodiment of FIG. 19 is similar to the exemplary embodiment of FIG. 10. Therefore, only a different portion will be described hereinafter.

Referring to FIG. 19, the width of a plurality of bus lines BL along a first direction P gradually increases. As shown in FIG. 19, the first direction P may be a direction from an outer portion of the bus lines BL inward toward the lens area LA rather than being fixed to one direction. Thus, the first direction P may be toward a lower portion from an upper portion in an upper bus line portion BLP1, toward an upper portion from a lower portion in a lower bus line portion BLP3, toward the left side from the right side in a right bus line portion BLP4, and toward the right side from the left side in a left bus line portion BLP2. That is, the width of the bus lines gradually increases in a direction from the outermost bus line toward the closest bus line to a lens area LA.

In this case, referring to FIG. 2, a widest bus line is connected to the middle electrode LE(N) of lens electrodes LE, and a narrowest bus line is connected to a first electrode L1 or a second electrode L2. Bus lines arranged between the widest bus line and the narrowest bus line may be sequentially connected to a first electrode L1 or a second electrode L2 of the corresponding lens electrode LE according to the width increase of the bus lines BL.

Excluding the above-described difference, the exemplary embodiment described with reference to FIG. 10 may be applied to the exemplary embodiment of FIG. 19.

Figure 20:
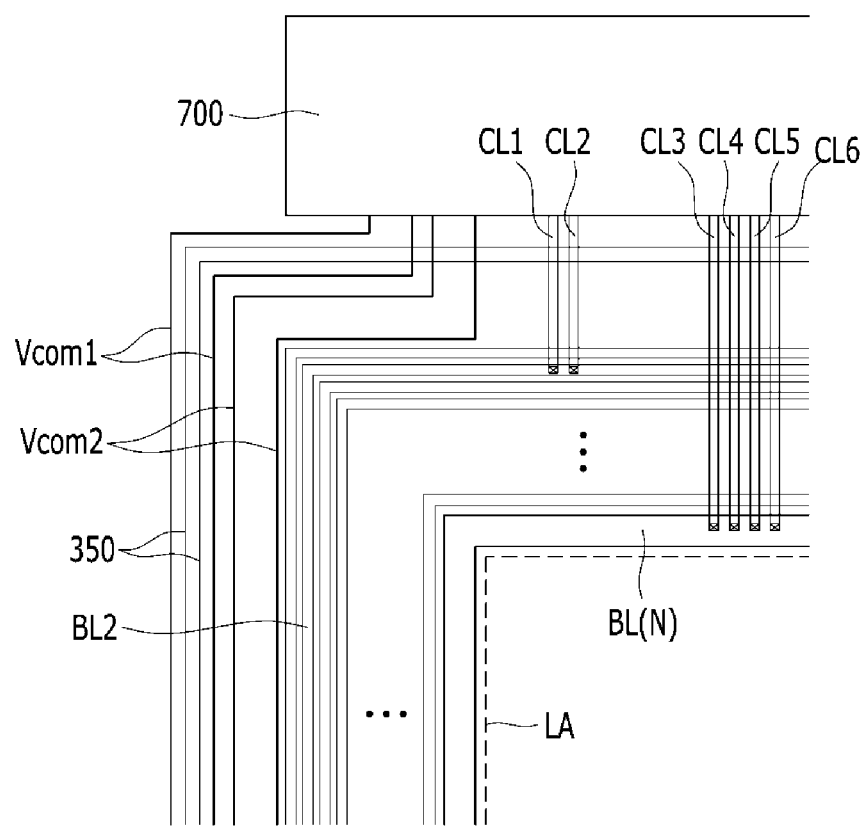
FIG. 20 is an enlarged view of area P of FIG. 10 of a multichannel structure according to an exemplary embodiment of the present disclosure.

FIG. 20 is an enlarged view of area P of FIG. 10 of a multichannel structure according to an exemplary embodiment of the present disclosure.

In a present exemplary embodiment, a lens driver 700 includes at least one driving channel portion 720 of FIG. 7. At least one driving channel portion includes a plurality of driving channels. Each of the plurality of driving channels included in the driving channel portion may be connected with a connection line CL.

Referring to FIG. 20, a plurality of connection lines CL may be connected to one bus line BL. For example, as shown in FIG. 20, an X bus line BL(N) is connected with a lens driver 700 through four connection lines CL, and a bus line BL2 disposed at an outer side of the lens area LA is connected to the lens driver 700 through two connection lines CL. In this case, each driving channel connected with each connection line CL may have the same output. A middle electrode LE(N) of lens electrodes LE connected to the X bus line BL(N) is wide, thereby having a large load. Therefore, many driving channels may be connected to the X bus line BL(N) compared to other bus lines BL. In a present exemplary embodiment, the number of driver pad wires 33 and the number of connection electrodes CL described in FIG. 7 may increase as the number of driving channels connected to the X bus line BL(N) increases.

One driving channel portion may be included in the lens driver 700, but when a plurality of driving channel portions are formed, a periodic structure may be provided to connect the bus lines and a plurality of driving channels in one driving channel portion.

Figure 21:
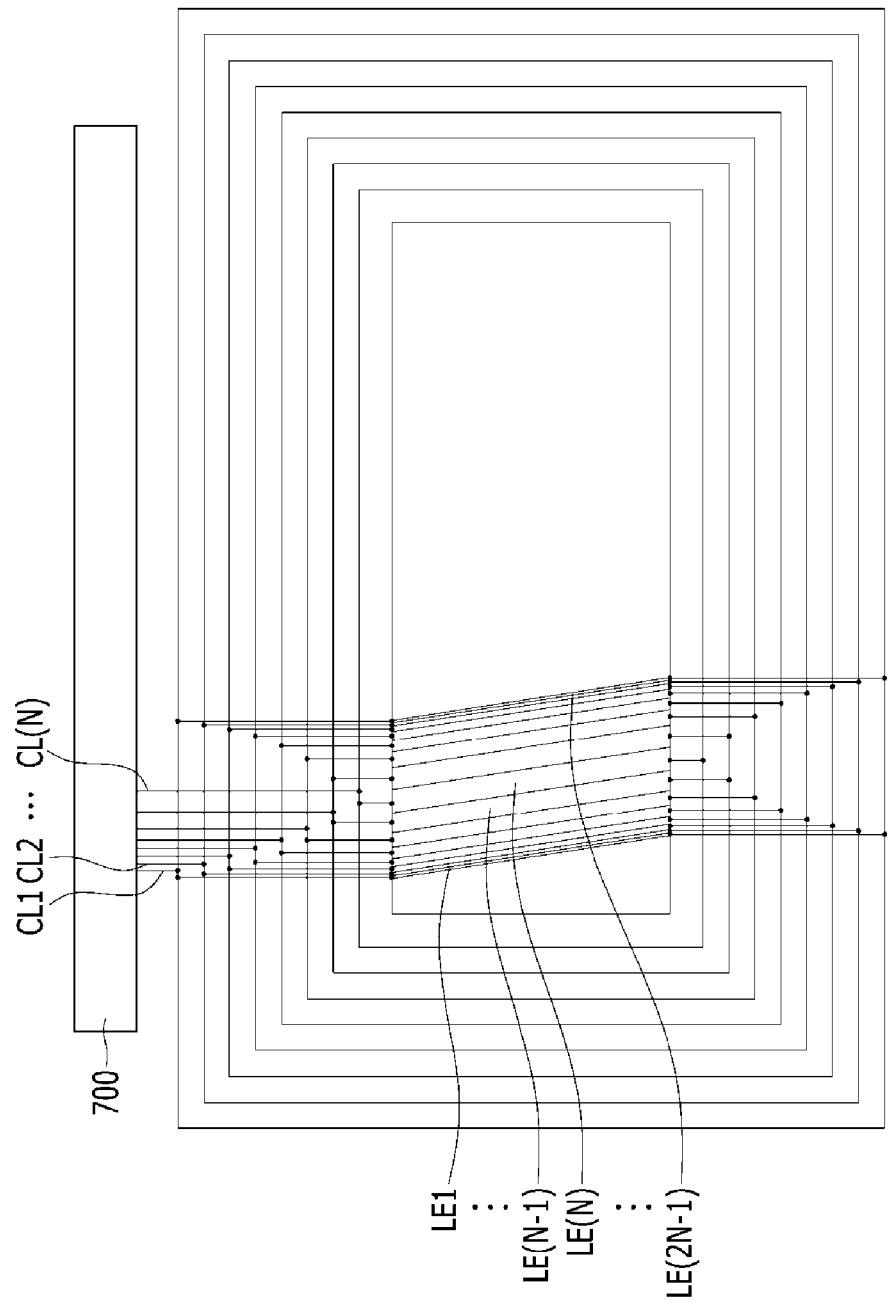
FIG. 21 schematically shows a connection relationship of bus lines, lens electrodes, and a lens driver in a first substrate of a lens panel of a display device according to an exemplary variation of the exemplary embodiment of FIG. 2.

FIG. 21 schematically shows a connection relationship of bus lines, lens electrodes, and a lens driver in a first substrate of a lens panel of a display device according to an exemplary variation of the exemplary embodiment of FIG. 2.

The exemplary embodiment of FIG. 21 is similar to the exemplary embodiment of FIG. 2. Therefore, only a different portion will be described hereinafter.

Referring to FIG. 21, the number of connection lines CL is half of the number of lens electrodes LE. In detail, there are N connection lines CL that correspond to the number of lens electrodes LE from a narrowest electrode to the middle electrode LE(N). As previously described with reference to FIGS. 3B and 3C, if the lens electrodes LE are symmetric with reference to the middle electrode LE(N), two symmetric lens electrodes LE may be connected to one bus line BL.

Excluding the above-described difference, the description related to FIG. 2 can be applied to the exemplary embodiment of FIG. 21.

Figure 22:
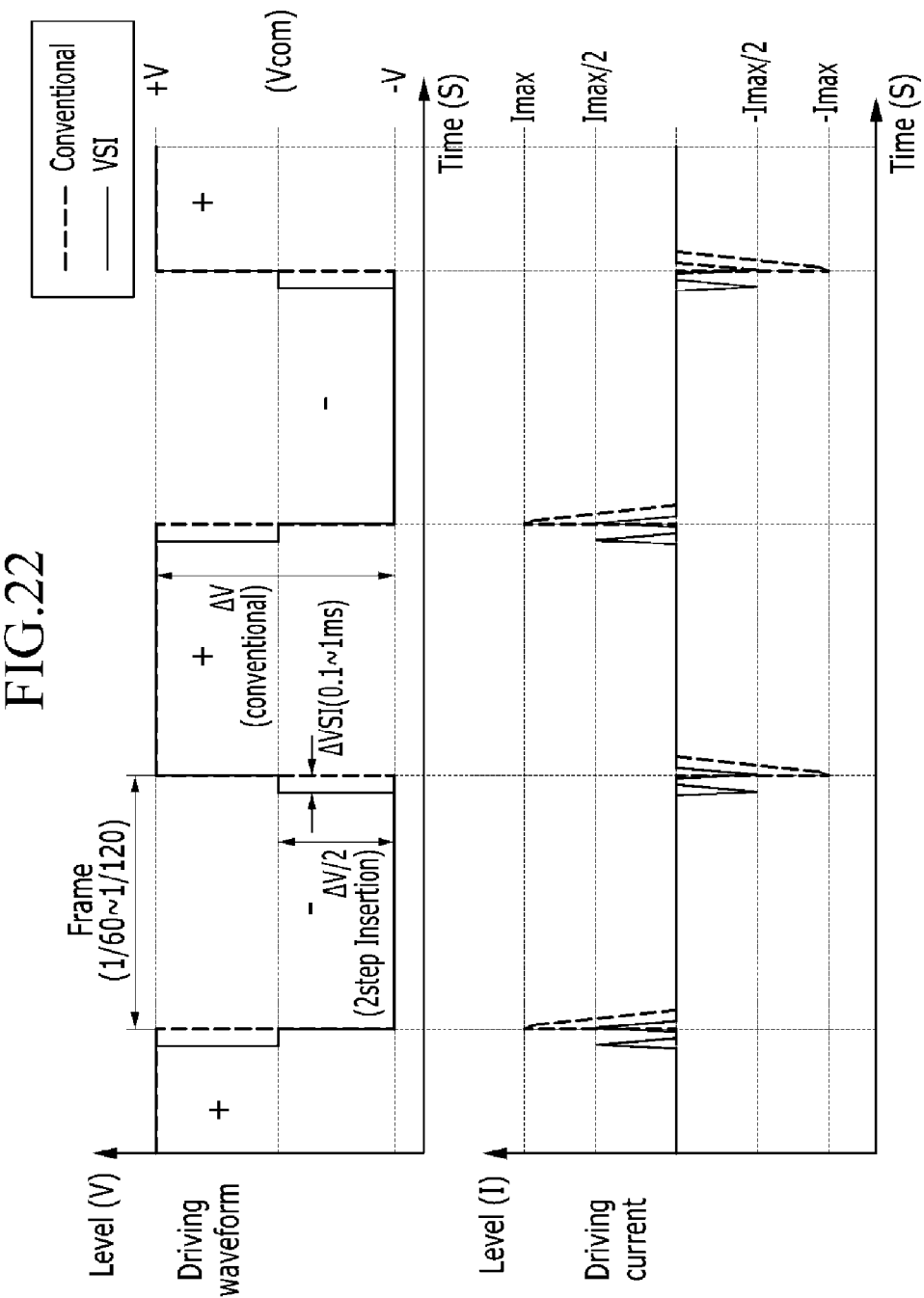
FIG. 22 is a graph of a voltage driving waveform and a current waveform of a lens panel according to an exemplary embodiment of the present disclosure and a voltage driving waveform and a current waveform of a lens panel according to a conventional case.

FIG. 22 is a graph of a voltage driving waveform and a current waveform of a lens panel according to an exemplary embodiment of the present disclosure, and a voltage driving waveform and a current waveform of a lens panel according to a conventional case. In FIG. 22, the dotted lines denote a conventional voltage application method and a current waveform, and the solid lines denote a voltage step insertion (VSI) and a current waveform according to a present exemplary embodiment.

Referring to FIG. 22, a lens panel according to a present exemplary embodiment may be inversely driven to prevent deterioration of the lens panel. When a lens panel is inversely driven, a current is generated when charging and discharging occur in the lens panel, and a peak current may be very high because load increases as the size of the lens panel increases.

Therefore, in a present exemplary embodiment, voltage step insertion is used as shown in FIG. 22 to reduce the peak current. In detail, the voltage waveform according to a present exemplary embodiment has a step-shape voltage level before occurrence of the inverse driving. As shown in the drawing, the peak current is reduced by half for the 2 step insertion. The number of steps may be 2 to 8 depending on the magnitude of a voltage.

The duration of a step waveform insertion may be short to prevent liquid crystal relaxation from occurring. For example, the duration of a step waveform insertion may be above 1 microsecond and below 1 millisecond depending on the type of liquid crystal.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A liquid crystal lens module comprising:
    a first substrate that includes a plurality of lens electrodes and a plurality of bus lines;
    a second substrate facing the first substrate; and
    a liquid crystal layer provided between the first substrate and the second substrate,
    wherein the plurality of bus lines comprise at least two bus lines having different widths,
    the plurality of lens electrodes comprising at least two lens electrodes having different widths and
    a widest bus line of the at least two bus lines is connected to a widest lens electrode of the at least two lens electrodes,
    wherein the first substrate comprises a lens area and a peripheral area surrounding the lens area, the plurality of lens electrodes are disposed in the lens area, and the plurality of bus lines are disposed in the peripheral area.

2. The liquid crystal lens module of claim 1, wherein the plurality of lens electrodes comprise the first electrodes and the second electrodes which are electrically insulated from each other.

3. The liquid crystal lens module of claim 2, wherein the at least two bus lines comprise an X bus line having a larger width and a Y bus line having a smaller width, and the X bus line is disposed closest to the lens area.

4. The liquid crystal lens module of claim 3, wherein the plurality of bus lines comprise upper bus line portions, lower bus line portions, left bus line portions, and right bus line portions, and the upper bus line portions and the lower bus line portions are disposed on long sides of the peripheral area while the left bus line portions and the right bus line portions are disposed on short sides of the peripheral area.

5. The liquid crystal lens module of claim 4, further comprising a lens driver disposed in the peripheral area, wherein the lens driver is disposed adjacent to the upper bus line portion and comprises a plurality of driving channels.

6. The liquid crystal lens module of claim 4, wherein the plurality of bus lines continuously surround the lens area.

7. The liquid crystal lens module of claim 5 wherein the width of the upper bus line portion is less than the width of the lower bus line portion, the width of the left bus line portion, and the width of the right bus line portion.

8. The liquid crystal lens module of claim 4, wherein the plurality of lens electrodes comprise a middle electrode that is a widest electrode of the plurality of lens electrodes, and the middle electrode is connected with the X bus line.

9. The liquid crystal lens module of claim 8, wherein at least one bus line of the plurality of bus lines is connected to at least two driving channels of the plurality of driving channels.

10. The liquid crystal lens module of claim 9, wherein the number of driving channels connected to the X bus line is greater than the number of driving channels connected to the Y bus line.

11. The liquid crystal lens module of claim 10, wherein the plurality of driving channels have the same output.

12. The liquid crystal lens module of claim 8, wherein each of the plurality of driving channels is connected to each of the plurality of bus lines.

13. The liquid crystal lens module of claim 12, wherein at least two driving channels of the plurality of driving channels have different outputs.

14. The liquid crystal lens module of claim 13, wherein a voltage output from the driving channel connected to the X bus line is greater than a voltage output from the driving channel connected to the Y bus line.

15. The liquid crystal lens module of claim 4, further comprising: a plurality of lens drivers disposed in the peripheral area, each of the plurality of lens drivers comprising a plurality of driving channels; and
a periodic structure that connects the plurality of driving channels to the plurality of bus lines in one driving channel portion.

16. The liquid crystal lens module of claim 4, wherein the upper bus line portion, the left bus line portion, the lower bus line portion, and the right bus line portion are connected with each other such that one line is formed.

17. The liquid crystal lens module of claim 16, wherein one end of each of the plurality of lens electrodes is connected with the upper bus line portions, and the other end of each of the plurality of lens electrodes is connected with the lower bus line portions.

18. The liquid crystal lens module of claim 17, further comprising a lens driver disposed adjacent to the upper bus line portion, wherein the lens driver comprises a plurality of driving channels, and the plurality of driving channels are directly connected to the upper bus line portion.

19. The liquid crystal lens module of claim 4, wherein all neighboring bus lines of the plurality of bus lines have the same gap.

20. The liquid crystal lens module of claim 4, further comprising:
a common electrode line disposed on the first substrate and located at an outer side of the plurality of bus lines; and
a common electrode disposed on the second substrate, wherein the common electrode line comprises a first common electrode line and a second common electrode line.

21. The liquid crystal lens module of claim 20, wherein the first common electrode line has a shorting portion adjacent to at least one of the left bus line portions and the right bus line portions, and the first common electrode line and the second common electrode line are electrically connected with the common electrode through the shorting portion.

22. The liquid crystal lens module of claim 21, further comprising a sealant disposed at an outer side of the plurality of bus lines that bonds the first substrate and the second substrate to each other, wherein the first common electrode line is disposed between the sealant and the plurality of bus lines.

23. The liquid crystal lens module of claim 22, wherein the second common electrode line overlaps the sealant, the sealant is made of a conductive material, and the second common electrode line is electrically connected with the common electrode.

24. The liquid crystal lens module of claim 21, wherein the first common electrode line and the second common electrode line are applied with different voltages.

25. The liquid crystal lens module of claim 4, wherein the plurality of lens drivers generate inverse driving signals.

26. The liquid crystal lens modules of claim 25, wherein the inverse driving signal has a step-shaped voltage level before inversion driving.

27. The liquid crystal lens module of claim 4, wherein the plurality of bus lines comprise a plurality of Y bus lines having a width that is less than that of the X bus line, and the widths of the plurality of Y bus lines gradually increase from a narrowest Y bus line along a direction toward the X bus line.

28. The liquid crystal lens module of claim 27, wherein the first electrode and the second electrode form a unit lens,
wherein the unit lens is divided into a plurality of refractive areas, and
wherein the width of the first electrode and the width of second electrode are gradually increased toward a refractive area at the center of the unit lens from a refractive area at the edge of the unit lens.

29. The liquid crystal lens area of claim 28, wherein Lx:Bx=Ly:By, wherein By is the width of the X bus line, Bx is the width of the Y bus line, Ly is the width of a lens electrode connected with the X bus line, and Lx is the width of a lens electrode connected with the Y bus line.

30. The liquid crystal lens module of claim 29, wherein $0.5*(Ly*Bx)/Lx < By \leq (Ly*Bx)/Lx$.

31. A liquid crystal lens module comprising:
a first substrate that includes a plurality of lens electrodes and a plurality of bus lines;
a second substrate facing the first substrate; and
a liquid crystal layer provided between the first substrate and the second substrate,
wherein the plurality of bus lines comprise at least two bus lines having different widths,
the plurality of lens electrodes comprise at least two lens electrodes having different widths, and
a widest bus line of the at least two bus lines is connected to a lens electrode having a central position of the plurality of lens electrodes,
wherein the first substrate comprises a lens area and a peripheral area surrounding the lens area, the plurality of lens electrodes are disposed in the lens area, and the plurality of bus lines are disposed in the peripheral area.

* * * * *